(12) United States Patent
Hu et al.

(10) Patent No.: US 10,652,899 B2
(45) Date of Patent: May 12, 2020

(54) DATA TRANSMISSION METHOD AND APPARATUS

(71) Applicant: HUAWEI TECHNOLOGIES CO., LTD., Shenzhen, Guangdong (CN)

(72) Inventors: Xingxing Hu, Shanghai (CN); Tianle Deng, Shenzhen (CN); Kaijie Zhou, Shenzhen (CN); Xinzheng Wang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/023,378

(22) Filed: Jun. 29, 2018

(65) Prior Publication Data
US 2018/0324811 A1    Nov. 8, 2018

Related U.S. Application Data

(63) Continuation of application No. PCT/CN2015/100072, filed on Dec. 31, 2015.

(51) Int. Cl.
*H04W 72/04*    (2009.01)
*H04W 72/12*    (2009.01)
(Continued)

(52) U.S. Cl.
CPC ... *H04W 72/0493* (2013.01); *H04W 28/0247* (2013.01); *H04W 72/042* (2013.01);
(Continued)

(58) Field of Classification Search
CPC .. H04W 74/08; H04W 84/12; H04W 72/0413
See application file for complete search history.

(56) References Cited

U.S. PATENT DOCUMENTS

2009/0190566 A1    7/2009 Kwon et al.
2012/0044878 A1    2/2012 Ratasuk et al.
(Continued)

FOREIGN PATENT DOCUMENTS

CN    102083224 A    6/2011
CN    102149080 A    8/2011
(Continued)

OTHER PUBLICATIONS

Extended European Search Report, dated Mar. 12, 2018, in European Application No. 15911900.7 (7 pp.).
(Continued)

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

This application relates to the communications field, and in particular, to a data transmission method, an apparatus, and a system. In the data transmission method, a base station determines a transmission policy, where the transmission policy is used for contention-based uplink data transmission or non-contention based uplink data transmission; and sends the transmission policy to a terminal. The terminal receives the transmission policy sent by the base station, and sends uplink data to the base station based on the transmission policy. With a solution in this application, the base station can determine an appropriate transmission policy based on a network status, and send the transmission policy to the terminal, and the terminal can use, based on the transmission policy, an appropriate transmission mode to send uplink data to the base station, so that transmission efficiency is improved.

17 Claims, 13 Drawing Sheets

(51) Int. Cl.
H04W 28/02 (2009.01)
H04W 72/14 (2009.01)
H04W 74/08 (2009.01)
H04W 88/02 (2009.01)
H04W 88/08 (2009.01)

(52) U.S. Cl.
CPC ........... *H04W 72/12* (2013.01); *H04W 72/14* (2013.01); *H04W 74/08* (2013.01); *H04W 88/02* (2013.01); *H04W 88/08* (2013.01)

(56) References Cited

U.S. PATENT DOCUMENTS

| | | | |
|---|---|---|---|
| 2012/0147830 A1* | 6/2012 | Lohr | H04L 1/1854 370/329 |
| 2012/0157141 A1 | 6/2012 | Lim et al. | |
| 2014/0254544 A1 | 9/2014 | Kar Kin Au et al. | |
| 2014/0328183 A1 | 11/2014 | Au et al. | |
| 2016/0323914 A1 | 11/2016 | Au et al. | |
| 2017/0171878 A1* | 6/2017 | Chun | H04L 27/26 |

FOREIGN PATENT DOCUMENTS

| | | |
|---|---|---|
| CN | 103069914 A | 4/2013 |
| CN | 103796320 A | 5/2014 |
| CN | 105191228 A | 12/2015 |

OTHER PUBLICATIONS

International Search Report dated for Sep. 21, 2018 in corresponding International Patent Application No. PCT/CN2015/100072.
International Search Report dated Sep. 21, 2016 in corresponding International Patent Application No. PCT/CN2015/100072.

* cited by examiner

DATA TRANSMISSION METHOD AND APPARATUS

CROSS-REFERENCE TO RELATED APPLICATIONS

This application is a continuation of International Application No. PCT/CN2015/100072, filed on Dec. 31, 2015, the disclosure of which is hereby incorporated by reference in its entirety.

TECHNICAL FIELD

The present invention relates to the wireless communications field, and in particular, to a data transmission method, an apparatus, and a system.

BACKGROUND

With development of communications technologies, more terminals need to access a wireless network, and consequently it is difficult for the network to fixedly allocate resources for all terminals to transmit data. Therefore, all the terminals transmit data by sharing some resources, for example, the terminals transmit data in a non-contention based manner. The non-contention based manner is also referred to as a scheduling-based manner in which a terminal transmits data after obtaining a dedicated resource allocated by a base station. However, in the manner, a large quantity of signaling interactions are required, and consequently overheads are relatively high, and transmission efficiency is relatively low. In this background, a contention-based manner is put forward. The contention-based manner is also referred to as a non-scheduling based manner in which a resource used by a terminal to transmit data is not a dedicated resource but a resource shared by a plurality of terminals.

In the prior art, a terminal determines to use the contention-based manner or the non-contention based manner for transmitting data. However, the terminal does not know a current network status when determining a transmission mode, and consequently the determined transmission mode may be inappropriate.

SUMMARY

Embodiments of the present invention provide a data transmission method, an apparatus, and a system, so as to resolve a prior-art problem that a transmission mode determined by a terminal is inappropriate.

According to an aspect, an embodiment of the present invention provides a data transmission method, including: determining, by a base station, a transmission parameter, where the transmission parameter is used for contention-based uplink data transmission or non-contention based uplink data transmission; and sending, by the base station, the transmission policy to a terminal. Therefore, the base station can comprehensively consider an actual status of the terminal and an actual status of a network, to determine an appropriate transmission policy, so that transmission efficiency is improved.

In a possible design, the base station may determine the transmission policy based on at least one of a size of to-be-sent downlink data, a quantity of contention-based uplink services, quality of service QoS of a downlink service, and a remaining resource capacity of a physical downlink control channel PDCCH. The base station may determine the transmission policy based on a specific priority order or another rule and the foregoing factors, to obtain relatively high transmission efficiency by determining an appropriate transmission policy as much as possible. For example, when there is relatively large amount of to-be-sent downlink data or a relatively large quantity of contention-based uplink services, transmission efficiency is higher if a non-contention based manner is used. For another example, when relatively high QoS of a downlink service is required, the non-contention based manner is more appropriate; or when relatively low QoS of a downlink service is required, transmission efficiency is higher if a contention-based manner is used.

In a possible design, when at least one of the following conditions is met: the size of the to-be-sent downlink data is greater than or equal to a first threshold, the quantity of the contention-based uplink services is greater than or equal to a second threshold, the remaining resource capacity of the PDCCH is greater than or equal to a third threshold, and the QoS of the downlink service meets a first preset condition, the base station may determine the transmission policy as a first transmission, where the first transmission indication is used to indicate the non-contention based uplink data transmission. Alternatively, when at least one of the following conditions is met: the size of the to-be-sent downlink data is less than a fourth threshold, the quantity of the contention-based uplink services is less than a fifth threshold, the remaining resource capacity of the PDCCH is less than a sixth threshold, and the QoS of the downlink service does not meet a second preset condition, the base station may determine the transmission policy as a second transmission indication, where the second transmission indication is used to indicate the contention-based uplink data transmission. Alternatively, when at least one of the following conditions is met: the size of the to-be-sent downlink data is greater than or equal to a fourth threshold and is less than a first threshold, the quantity of the contention-based uplink services is greater than or equal to a fifth threshold and is less than a second threshold, the remaining resource capacity of the PDCCH is greater than or equal to a sixth threshold and is less than a third threshold, and the QoS of the downlink service meets a second preset condition and does not meet a first preset condition, the base station determines the transmission policy as a transmission parameter, and transmission parameter is used to determine the contention-based uplink data transmission or the non-contention based uplink data transmission, where the fourth threshold is less than the first threshold, the fifth threshold is less than the second threshold, and the sixth threshold is less than the third threshold. Therefore, the base station may clearly instruct, based on a specific case of various factors, the terminal to use which transmission mode, or may send the transmission parameter to the terminal, so that the terminal can comprehensively determine, based on the transmission parameter and other information of the terminal, to use which transmission mode.

In a possible design, the QoS of the downlink service may include at least one of a delay, a bit error rate, and a packet loss rate that are allowed by the downlink service. When the transmission policy is the first transmission indication, that the QoS of the downlink service meets the first preset condition includes at least one of the following cases: the delay is greater than or equal to a first sub-threshold, the bit error rate is greater than or equal to a second sub-threshold, and the packet loss rate is greater than or equal to a third sub-threshold; or when the transmission policy is the second transmission indication, that the QoS of the downlink service does not meet the second preset condition includes at least one of the following cases: the delay is less than a fourth sub-threshold, the bit error rate is less than a fifth sub-threshold, and the packet loss rate is less than a sixth sub-threshold; or when the transmission policy is the transmission parameter, that the QoS of the downlink service meets the second preset condition and does not meet the first preset condition includes at least one of the following cases: the delay is greater than or equal to the fourth sub-threshold and is less than a first sub-threshold, the bit error rate is greater than or equal to a fifth sub-threshold and is less than a second sub-threshold, and the packet loss rate is greater than or equal to a sixth sub-threshold and is less than a third sub-threshold, where the fourth sub-threshold is less than the first sub-threshold, the fifth sub-threshold is less than the second sub-threshold, and the sixth sub-threshold is less than the third sub-threshold.

In a possible design, when the terminal sends uplink data to the base station in a non-contention based manner, the base station further receives a first request sent by the terminal, where the first request is used to request the contention-based uplink data transmission; sends a request acknowledgment message to the terminal, where the request acknowledgment message is used to grant the contention-based uplink data transmission; and receives uplink data sent by the terminal in a contention-based manner. Alternatively, when the terminal sends uplink data to the base station in a contention-based manner, the base station further receives a second request sent by the terminal, where the second request is used to request the non-contention based uplink data transmission; sends a grant message to the terminal, where the grant message is used to grant the non-contention based uplink data transmission, and is used to allocate a resource; and receives uplink data sent by the terminal in a non-contention based manner. When the terminal has used a transmission mode, but determines that another transmission mode is more appropriate, the terminal may send a request to the base station, to switch the transmission mode after a grant is obtained. Therefore, the terminal can send the uplink data without a need to complete all processes of the another transmission mode, so that transmission efficiency is improved.

In a possible design, when the terminal sends the uplink data to the base station in the contention-based manner, the base station further sends timing advance information to the terminal, where the timing advance information is used for uplink synchronization. Therefore, the terminal can achieve uplink synchronization, a signal transmitted by the terminal and a signal transmitted by another synchronized terminal are mutually orthogonal, and mutual interference is avoided.

According to another aspect, an embodiment of the present invention provides a data transmission method, including: receiving, by a terminal, a transmission policy sent by a base station, where the transmission policy is used for contention-based uplink data transmission or non-contention based uplink data transmission; and sending, by the terminal, uplink data to the base station based on the transmission policy.

In a possible design, the transmission policy is a first transmission indication, the first transmission indication is used to indicate the non-contention based uplink data transmission, and the terminal sends the uplink data to the base station in a non-contention based manner based on the first transmission indication; or the transmission policy is a second transmission indication, the second transmission indication is used to indicate the contention-based uplink data transmission, and the terminal sends the uplink data to the base station in a contention-based manner based on the second transmission indication; or the transmission policy is a transmission parameter, the transmission parameter is used to determine the contention-based uplink data transmission or the non-contention based uplink data transmission, and the terminal determines, based on the transmission parameter, to use a non-contention based manner or a contention-based manner to send the uplink data to the base station.

In a possible design, when the terminal sends the uplink data to the base station in the non-contention based manner, if the terminal determines that a preset condition for the contention-based uplink data transmission is met, the terminal sends a first request to the base station, where the first request is used to request the contention-based uplink data transmission; receives a request acknowledgment message sent by the base station, where the request acknowledgment message is used to grant the contention-based uplink data transmission; and sends the uplink data to the base station in the contention-based manner. Alternatively, when the terminal sends the uplink data to the base station in the contention-based manner, if the terminal determines that a preset condition for the non-contention based uplink data transmission is met, the terminal determines a second request to the base station, where the second request is used to request the non-contention based uplink data transmission; receives a grant message sent by the base station, where the grant message is used to grant the non-contention based uplink data transmission, and is used to allocate a resource; and sends the uplink data to the base station in the non-contention based manner.

In a possible design, when the terminal sends the uplink data to the base station in the contention-based manner, the terminal further receives timing advance information sent by the base station, where the timing advance information is used for uplink synchronization.

According to still another aspect, an embodiment of the present invention provides a data transmission method, including: when a terminal sends uplink data to a base station in a non-contention based manner, receiving, by the base station, a first request sent by the terminal, where the first request is used to request contention-based uplink data transmission; sending, by the base station, a request acknowledgment message to the terminal, where the request acknowledgment message is used to grant the contention-based uplink data transmission; and receiving, by the base station, uplink data sent by the terminal in a contention-based manner. Alternatively, the method includes: when a terminal sends uplink data to a base station in a contention-based manner, receiving, by the base station, a second request sent by the terminal, where the second request is used to request non-contention based uplink data transmission; sending, by the base station, a grant message to the terminal, where the grant message is used to grant the non-contention based uplink data transmission, and is used to allocate a resource; and receiving, by the base station, uplink data sent by the terminal in a non-contention based manner.

According to still another aspect, an embodiment of the present invention provides a data transmission method, including: when a terminal sends uplink data to a base station in a non-contention based manner, if the terminal determines that a preset condition for contention-based uplink data transmission is met, sending, by the terminal, a first request to the base station, where the first request is used to request the contention-based uplink data transmission; receiving, by the terminal, a request acknowledgment message sent by the base station, where the request acknowledgment message is used to grant the contention-based uplink data transmission; and sending, by the terminal, the uplink data to the base station in a contention-based manner. Alternatively, the method includes: when a terminal sends uplink data to a base station in a contention-based manner, if the terminal determines that a preset condition for non-contention based uplink data transmission is met, sending, by the terminal, a second request to the base station, where the second request is used to request the non-contention based uplink data transmission; receiving, by the terminal, a grant message sent by the base station, where the grant message is used to grant the non-contention based uplink data transmission, and is used to allocate a resource; and sending, by the terminal, the uplink data to the base station in a non-contention based manner.

According to still another aspect, an embodiment of the present invention provides a data transmission method, including: receiving, by a base station, uplink data sent by a terminal in a contention-based manner, where the terminal is in non-synchronized mode; estimating, by the base station, timing advance information of the terminal based on the uplink data, where the timing advance information is used for uplink synchronization; and sending, by the base station, the timing advance information to the terminal, to enable the terminal to adjust to synchronized mode.

According to still another aspect, an embodiment of the present invention provides a data transmission method, including: sending, by a terminal, uplink data to a base station in a contention-based manner, where the terminal is in non-synchronized mode; receiving, by the terminal, timing advance information sent by the base station, where the timing advance information is used for uplink synchronization; and adjusting, by the terminal, to synchronized mode based on the timing advance information.

According to still another aspect, an embodiment of the present invention provides a data transmission method, including: determining, by a network side device, a transmission policy, where the transmission policy is used for contention-based uplink data transmission or non-contention based uplink data transmission; and sending, by the network side device, the transmission policy to a terminal.

According to still another aspect, an embodiment of the present invention provides a data transmission method, including: receiving, by a terminal, a transmission policy sent by a network side device, where the transmission policy is used for contention-based uplink data transmission or non-contention based uplink data transmission; and sending, by the terminal, uplink data to the network side device based on the transmission policy.

According to still another aspect, an embodiment of the present invention provides a network side device, and the network side device has a function of implementing a behavior of the network side device in the foregoing method design. The function may be implemented by using hardware, or may be implemented by executing corresponding software by hardware. The hardware or the software includes one or more modules corresponding to the function.

In a possible design, the network side device may be a base station. In a possible implementation, a structure of the base station may include a processor, a transmitter, and a receiver. The processor is configured to support the base station in performing corresponding functions in the foregoing method. The transmitter and the receiver are configured to support communication between the base station and a terminal. The transmitter is configured to send information or an instruction related to the foregoing method to the terminal; and the receiver is configured to receive the information or the instruction related in the foregoing method that is sent by the terminal. The base station may further include a memory, where the memory is configured to couple to the processor and store a program instruction and data that are necessary for the base station.

According to still another aspect, an embodiment of the present invention provides a terminal, and the terminal has a function of implementing a behavior of the terminal in the foregoing method design. The function may be implemented by using hardware, or may be implemented by executing corresponding software by hardware. The hardware or the software includes one or more modules corresponding to the function.

In a possible design, a structure of the terminal includes a receiver, a transmitter, and a processor. The processor is configured to support a base station in performing corresponding functions in the foregoing method; the receiver is configured to support the terminal in receiving various pieces of information or instructions that are sent by the base station in the foregoing method; and the transmitter is configured to support the terminal in sending the various pieces of information or instructions that are related to the foregoing method to the base station.

According to still another aspect, an embodiment of the present invention provides a communications system. The system includes the network side device and the terminal according to the foregoing aspects, or the system includes the base station and the terminal according to the foregoing aspects.

According to yet another aspect, an embodiment of the present invention provides a computer storage medium, configured to store computer software instructions used by the foregoing network side device or the foregoing base station, including a program designed for performing the foregoing aspects.

According to yet another aspect, an embodiment of the present invention provides a computer storage medium, configured to store a computer software instruction used by the foregoing terminal, including a program designed for performing the foregoing aspects.

Compared with the prior art, in the solutions provided in the present invention, a base station can comprehensively consider an actual status of a terminal and a network, to determine an appropriate transmission policy and send the transmission policy to the terminal, so that the terminal can use an appropriate transmission mode to send uplink data to the base station, and transmission efficiency is improved.

BRIEF DESCRIPTION OF DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and a person of ordinary skill in the art can derive other drawings from the accompanying drawings without creative efforts.

FIG. 5b-1 and FIG. 5b-2 are a schematic communication diagram of another method for sending uplink data according to an embodiment of the present invention;

DESCRIPTION OF EMBODIMENTS

The technical solutions of the present invention will be clearly described in the following with reference to the accompanying drawings. It is obvious that the embodiments to be described are only some rather than all of the embodiments of the present invention. All other embodiments obtained by a person of ordinary skill in the art based on the embodiments of the present invention without creative efforts shall fall within the protection scope of the present invention.

Network architectures and service scenarios described in the following embodiments of the present invention are intended to describe the technical solutions in the embodiments of the present invention more clearly, but are not intended to limit the technical solutions provided in the embodiments of the present invention. A person of ordinary skill in the art may know that as the network architectures evolve and a new business scenario emerges, the technical solutions provided in the embodiments of the present invention also apply to a similar technical problem.

Figure 1:
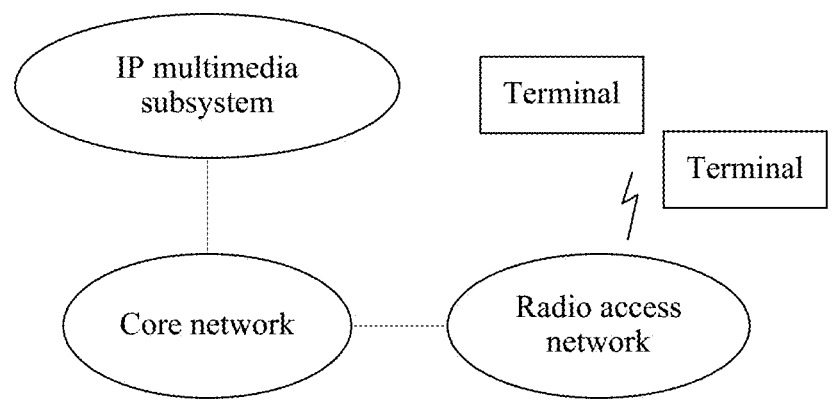
FIG. 1 is a schematic diagram of a possible application scenario of the present invention.

As shown in FIG. 1, a terminal accesses an Internet Protocol (IP) multimedia subsystem (IMS) network by using a radio access network (RAN) and a core network (CN). The technical solutions described in the present invention may be applied to a Long Term Evolution (LTE) system or other wireless communications systems that use various radio access technologies, for example, systems that use access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may also be applied to an evolved system subsequent to the LTE system, such as a $5^{th}$ generation (5G). For clarity, the LTE system is used only as an example herein for description. In the LTE system, an evolved universal terrestrial radio access network (E-UTRAN) is used as a radio access network, and an evolved packet core (EPC) network is used as a core network. The terminal accesses the IMS network by using the E-UTRAN and the EPC.

In the present invention, nouns "network" and "system" are usually interchangeably used, but meanings of the nouns may be understood by a person skilled in the art. The terminal related in the present invention may include various handheld devices, in-vehicle devices, wearable devices, or computing devices that have a wireless communication function, or another processing device connected to a wireless modem, and user equipment (UE), a mobile station (MS), and the like that are in various forms. For ease of description, in the present invention, the devices mentioned above are collectively referred to as the terminal. A network side device related in the present invention may be a core network device, or may be a base station, or may be a single radio controller, or may be a cloud radio access network (Cloud RAN) controller or another device. The single radio controller may be corresponding to a single radio controller, which is SRC for short, defined in the 3rd Generation Partnership Project (3GPP). A base station related in the present invention is an apparatus that is deployed in a radio access network and configured to provide a wireless communication function for the terminal. The base station may include a macro base station, a micro base station, a relay node, an access point, and the like that are in various forms. The base station may also be a base station controller (BSC) in a Global System for Mobile Communications (GSM) or a CDMA system, or a radio network controller (RNC) in a Wideband Code Division Multiple Access (WCDMA) system, or a base station (BS) or a centralized server or the like in various communications systems, or a combination of a base station and a controller. In systems that use different radio access technologies, names of devices that have functions of a base station may be different. For example, in the LTE system, a device having the functions of a base station is referred to as an evolved NodeB (eNodeB or eNB), and in a $3^{rd}$ Generation (3G) system, the device having the functions of a base station is referred to as a NodeB (NodeB) or the like. For ease of description, in the present invention, all the foregoing apparatuses that provide a wireless communication function for the terminal are collectively referred to as a base station or a BS. It should be understood that the base station related in the present invention includes both a base station in an existing communications system and a base station in a future communications system. This is not limited in the embodiments of the present invention.

Figure 2A:
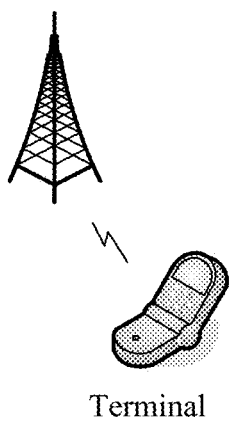
FIG. 2a is a schematic diagram of a possible system for implementing the present invention.
Figure 2B:
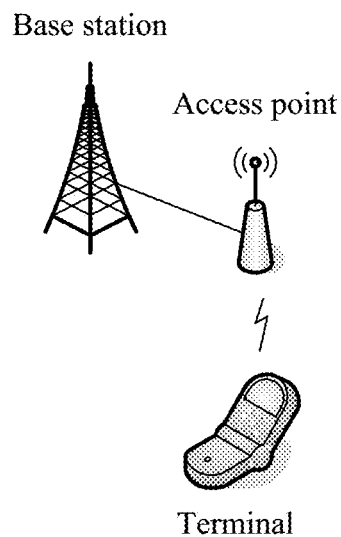
FIG. 2b is a schematic diagram of another possible system for implementing the present invention.
Figure 2C:
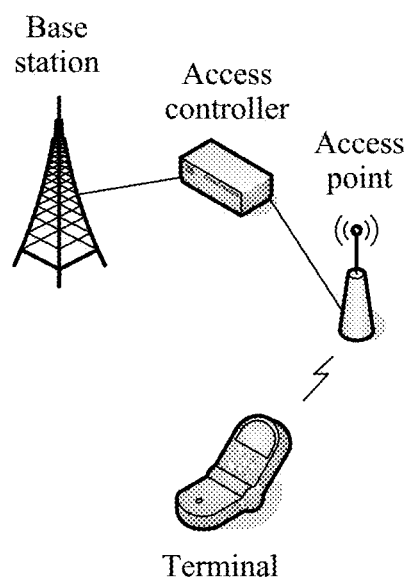
FIG. 2c is a schematic diagram of still another possible system for implementing the present invention.

FIG. 2a is a schematic diagram of a system according to an embodiment of the present invention. The system mainly includes a base station and a terminal. The base station and the terminal communicate with each other by using a cellular network. FIG. 2b is a schematic diagram of another system according to an embodiment of the present invention. The system mainly includes a base station, an access point (AP), and a terminal. The terminal and the AP communicate with each other by using a wireless local area network (WLAN). The AP and the base station are connected in a wired manner, and the terminal communicates with the base station through the AP. FIG. 2c is a schematic diagram of still another system according to an embodiment of the present invention. The system mainly includes a base station, an access controller (AC), an AP, and a terminal. The terminal and the AP communicate with each other by using a WLAN. The AP and the AC are connected in a wired manner, the AC and the base station are connected in a wired manner, and the terminal communicates with the base station through the AP and the AC. It may be understood that in the embodiments of the present invention, that the base station and the terminal transmit a signal may be as follows: The base station and the terminal transmit a signal by using the cellular network as shown in FIG. 2a; or the base station and the terminal transmit a signal through the AP as shown in FIG. 2b; or the base station and the terminal transmit a signal through the AC and the AP as shown in FIG. 2c. Certainly, when the base station and the terminal may further communicate with each other in another manner, the technical solutions provided in the embodiments of the present invention are also applicable.

The following further describes the embodiments of the present invention in detail based on the foregoing common parts related in the present invention.

An embodiment of the present invention provides a data transmission method and an apparatus and a system that are based on the method. A network side device determines a transmission policy, where the transmission policy is used for contention-based uplink data transmission or non-contention based uplink data transmission; and the network side device sends the transmission policy to a terminal. For example, that the network side device is a base station is used as an example. The base station may determine the transmission policy based on one or more of a size of to-be-sent downlink data, a quantity of contention-based uplink services, quality of service (QoS) of a downlink service, a remaining resource capacity of a physical downlink control channel (PDCCH), and another factor. Correspondingly, the terminal receives the transmission policy sent by the network side device, and sends uplink data to the network side device based on the transmission policy.

In the prior art, the terminal determines to use the contention-based uplink data transmission or the non-contention based uplink data transmission. However, when determining a transmission mode, the terminal does not consider a current network status. In the technical solutions provided in this embodiment of the present invention, the network side device can comprehensively consider a status of the terminal and a status of a network, to determine an appropriate transmission mode, so that transmission efficiency is improved. For example, when a relatively large amount of data needs to be transmitted, or relatively high transmission quality is required, the network side may determine to use the non-contention based transmission policy to improve efficiency; or when a relatively small amount of data needs to be transmitted, or relatively low transmission quality is required, the network side may determine to use the contention-based transmission policy to improve efficiency.

In subsequent description of the embodiments of the present invention, that a network side device is a base station is used as an example for description. The following describes the solution provided in this embodiment of the present invention with reference to FIG. 3.

301. The base station determines a transmission policy, where the transmission policy is used for contention-based uplink data transmission or non-contention based uplink data transmission.

In an example, the base station determines the transmission policy based on at least one of a size of to-be-sent downlink data, a quantity of contention-based uplink services, QoS of a downlink service, and a remaining resource capacity of a PDCCH. Further, the transmission policy may be a first transmission indication, a second transmission indication, or a transmission parameter. For example, the transmission policy is the first transmission indication, the first transmission indication is used to indicate the non-contention based uplink data transmission, and when at least one of the following conditions is met: the size of the to-be-sent downlink data is greater than or equal to a first threshold, the quantity of the contention-based uplink services is greater than or equal to a second threshold, the remaining resource capacity of the PDCCH is greater than or equal to a third threshold, and the QoS of the downlink service meets a first preset condition, the base station determines the first transmission indication. For another example, the transmission policy is the second transmission indication, the second transmission indication is used to indicate the contention-based uplink data transmission, and when at least one of the following conditions is met: the size of the to-be-sent downlink data is less than a fourth threshold, the quantity of the contention-based uplink services is less than a fifth threshold, the remaining resource capacity of the PDCCH is less than a sixth threshold, and the QoS of the downlink service does not meet a second preset condition, the base station determines the second transmission indication. For another example, the transmission policy is the transmission parameter, where the transmission parameter is used to determine the contention-based uplink data transmission or the non-contention based uplink data transmission, when at least one of the following conditions is met: the size of the to-be-sent downlink data is greater than or equal to a fourth threshold and is less than a first threshold, the quantity of the contention-based uplink services is greater than or equal to a fifth threshold and is less than a second threshold, the remaining resource capacity of the PDCCH is greater than or equal to a sixth threshold and is less than a third threshold, and the QoS of the downlink service meets a second preset condition and does not meet a first preset condition, the base station determines the transmission parameter, where the fourth threshold is less than the first threshold, the fifth threshold is less than the second threshold, and the sixth threshold is less than the third threshold.

In a possible implementation, the QoS of the downlink service includes at least one of a delay, a bit error rate, and a packet loss rate that are allowed by the downlink service. Whether the QoS of the downlink service meets the first preset condition or the second preset condition may be determined based on the following examples. For example, when the transmission policy is the first transmission indication, that the QoS of the downlink service meets the first preset condition includes at least one of the following cases: the delay is greater than or equal to a first sub-threshold, the bit error rate is greater than or equal to a second sub-threshold, and the packet loss rate is greater than or equal to a third sub-threshold. For another example, when the transmission policy is the second transmission indication, that the QoS of the downlink service does not meet the second preset condition includes at least one of the following cases: the delay is less than a fourth sub-threshold, the bit error rate is less than a fifth sub-threshold, and the packet loss rate is less than a sixth sub-threshold. For another example, when the transmission policy is the transmission parameter, that the QoS of the downlink service meets the second preset condition and does not meet the first preset condition includes at least one of the following cases: the delay is greater than or equal to a fourth sub-threshold and is less than a first sub-threshold, the bit error rate is greater than or equal to a fifth sub-threshold and is less than a second sub-threshold, and the packet loss rate is greater than or equal to a sixth sub-threshold and is less than a third sub-threshold, where the fourth sub-threshold is less than the first sub-threshold, the fifth sub-threshold is less than the second sub-threshold, and the sixth sub-threshold is less than the third sub-threshold.

In another example, the transmission policy may also be a first transmission indication or a second transmission indication. For example, the transmission policy is the first transmission indication, and when at least one of the following conditions is met: a size of to-be-sent downlink data is greater than or equal to a seventh threshold, a quantity of contention-based uplink services is greater than or equal to an eighth threshold, a remaining resource capacity of a PDCCH is greater than or equal to a ninth threshold, and QoS of a downlink service meets a third preset condition, the base station determines the first transmission indication. For another example, the transmission policy is the second transmission indication, and when at least one of the following conditions is met: a size of to-be-sent downlink data is less than a seventh threshold, a quantity of contention-based uplink services is less than an eighth threshold, a remaining resource capacity of a PDCCH is less than a ninth threshold, and QoS of a downlink service does not meet a third preset condition, the base station determines the second transmission indication. It should be noted that the seventh threshold may be equal to the first threshold or the fourth threshold, or may be any other value; the eighth threshold may be equal to the second threshold or the fifth threshold, or may be any other value; the ninth threshold may be equal to the third threshold or the sixth threshold, or may be any other value; and the third preset condition may be the same as the first preset condition, or may be the same as the second preset condition, or may be any other preset condition. A manner of determining whether the QoS of the downlink service meets the third preset condition is similar to a manner of determining whether the QoS of the downlink service meets the first preset condition or the second preset condition. Reference may be made to the foregoing detailed description, and details are not described herein.

In still another example, the base station determines the transmission policy based on an indication message sent by a core network device or another network element. For example, the indication message is used to indicate the non-contention based uplink data transmission, and the base station determines a first transmission indication based on the indication message. For another example, the indication message is used to indicate the contention-based uplink data transmission, and the base station determines a second transmission indication based on the indication message. For another example, the indication message is used to provide some parameters or factors for determining the transmission policy for the base station, and the base station determines the transmission policy based on the parameters or factors. For a specific implementation, refer to the manner of determining the transmission policy by the base station based on the factor such as the size of the to-be-sent downlink data. Details are not described herein.

In still another example, when the transmission policy is a transmission parameter, the transmission parameter may include content carried in a conventional broadcast message and at least one of uplink quality, uplink path loss, and uplink interference of a terminal. Therefore, the terminal can obtain the parameters in time, to determine to use a contention-based manner or a non-contention based manner to send uplink data to the base station.

302. The base station sends the transmission policy to a terminal. For example, when the terminal is a terminal in idle mode, the base station may send the transmission policy to the terminal based on a paging message or a media access control (MAC) control unit (MAC Control Element, MCE for short) message. For another example, when the terminal is a terminal in non-synchronized mode or synchronized mode, the base station may send the transmission policy to the terminal based on the PDCCH or an MCE message. It should be noted that the base station may send the transmission policy to the terminal when the terminal has sent uplink data in a particular transmission mode, or may send the transmission policy to the terminal when the terminal has not sent uplink data in any transmission mode.

In an example, when the terminal sends uplink data to the base station in a non-contention based manner after receiving the transmission policy, the base station may further receive a first request sent by the terminal. The first request is used to request the contention-based uplink data transmission. After receiving the first request, the base station may send a request acknowledgment message to the terminal, where the request acknowledgment message is used to grant the contention-based uplink data transmission; or the base station may send a first request non-acknowledgment message to the terminal, where the first request non-acknowledgment message is used to forbid the contention-based uplink data transmission; or the base station may not send any message to the terminal, to ignore the request of the terminal. If the base station sends the request acknowledgment message to the terminal, when the terminal sends the uplink data to the base station in a contention-based manner, if a cell in which the terminal is located has insufficient contention resources or has no available contention resource, the base station further allocates a contention resource to the terminal.

In another example, when the terminal sends uplink data to the base station in a contention-based manner after receiving the transmission policy, the base station may further receive a second request sent by the terminal. The second request is used to request the non-contention based uplink data transmission. After receiving the second request, the base station may send a grant message to the terminal, where the grant message is used to grant the non-contention based uplink data transmission and allocate a resource; or the base station may send a second request non-acknowledgment message to the terminal, where the second request non-acknowledgment message is used to forbid the non-contention based uplink data transmission; or the base station may not send any message to the terminal, to ignore the request of the terminal.

In still another example, when the terminal sends uplink data to the base station in a contention-based manner after receiving the transmission policy, the base station may further send some parameters or information to the terminal. For example, the parameters or the information may be carried in a broadcast message, radio resource control (RRC) signaling, an MCE message, or the PDCCH, and is used to notify the terminal that if the terminal continuously sends several data packets to the base station in a specified time period, the terminal may send the uplink data to the base station in a non-contention based manner after the specified time period expires. The several data packets may be several data packets carrying same content, or may be several data packets separately carrying specified content, or may be several data packets meeting another condition.

In still another example, the base station may further send timing advance information to the terminal. The timing advance information is used for uplink synchronization. For example, the timing advance information may be a timing advance command. The timing advance command may enable the terminal to adjust uplink transmission timing of a physical uplink control channel (PUCCH), a physical uplink shared channel (PUSCH), a sounding reference signal (SRS), or the like that is of a primary cell or a primary secondary cell, to achieve uplink synchronization. A size of the timing advance command may be determined based on an actual case. For example, in a case of a random access response (RAR), the size of the timing advance command may be 11 bits, and the base station may send the timing advance command to the terminal by using the RAR message. Alternatively, in another case, the size of the timing advance command may be 6 bits or another size, and the base station may send the timing advance command to the terminal by using a timing advance command MCE message.

303. The terminal receives the transmission policy sent by the base station.

In an example, the terminal receives the first transmission indication sent by the base station, where the first transmission indication is used to indicate the non-contention based uplink data transmission; or the terminal receives the second transmission indication sent by the base station, where the second transmission indication is used to indicate the contention-based uplink data transmission; or the terminal receives the transmission parameter sent by the base station, where the transmission parameter is used to determine the contention-based uplink data transmission or the non-contention based uplink data transmission.

304. The terminal sends uplink data to the base station based on the transmission policy.

In an example, the terminal sends the uplink data to the base station in the non-contention based manner based on the first transmission indication; or the terminal sends the uplink data to the base station in the contention-based manner based on the second transmission indication; or the terminal determines, based on the transmission parameter, to use the non-contention based manner or the contention-based manner to send the uplink data to the base station.

In another example, if the terminal receives the transmission parameter sent by the base station, the terminal may determine to use the contention-based uplink data transmission or the non-contention based uplink data transmission in the following manner: The terminal determines a modulation and coding scheme (MCS) based on at least one of uplink quality of the terminal, an uplink path loss, and uplink interference that are included in the transmission parameter, determines an amount of data allowed to be transmitted by the terminal each time, and then estimates a quantity of times required for transmitting a currently buffered data amount. If the quantity of required transmission times is greater than or equal to a preset value, the non-contention based uplink data transmission is used; or if the quantity of required transmission times is less than a preset value, the contention-based uplink data transmission is used. The quantity of required transmission times=a currently buffered data amount/a data amount allowed during each transmission, and a calculation result is rounded up.

In still another example, when the terminal sends the uplink data to the base station in the non-contention based manner after receiving the transmission policy, if the terminal determines that a preset condition for the contention-based uplink data transmission is met, the terminal sends the first request to the base station, where the first request is used to request the contention-based uplink data transmission. After sending the first request, the terminal may further receive the request acknowledgment message sent by the base station, where the request acknowledgment message is used to grant the contention-based uplink data transmission, and then the terminal sends the uplink data to the base station in the contention-based manner; or the terminal may further receive the first request non-acknowledgment message sent by the base station, where the first request non-acknowledgment message is used to forbid the contention-based uplink data transmission, and then the terminal continues to send the uplink data to the base station in the non-contention based manner; or if the terminal receives no request acknowledgment message or the first request non-acknowledgment message within a time period, the terminal continues to send the uplink data to the base station in the non-contention based manner. If the terminal receives the request acknowledgment message, when the terminal sends the uplink data to the base station in the contention-based manner, if a cell in which the terminal is located has an available contention resource, the terminal sends the uplink data to the base station by using the available contention resource. If the cell in which the terminal is located has insufficient available contention resource or no available contention resource, the base station further allocates a contention resource to the terminal, and the terminal sends the uplink data to the base station by using the contention resource allocated by the base station.

In still another example, when the terminal sends the uplink data to the base station in the contention-based manner after receiving the transmission policy, if the terminal determines that a preset condition for the non-contention based uplink data transmission is met, the terminal sends the second request to the base station, where the second request is used to request the non-contention based uplink data transmission. After sending the second request, the terminal may further receive the grant message sent by the base station, where the grant message is used to grant the non-contention based uplink data transmission and allocate a resource, and then the terminal sends the uplink data to the base station in the non-contention based manner; or the terminal may further receive the second request non-acknowledgment message sent by the base station, where the second request non-acknowledgment message is used to forbid the non-contention based uplink data transmission, and then the terminal continues to send the uplink data to the base station in the contention-based manner; or if the terminal receives no grant message or the second request non-acknowledgment message within a time period, the terminal continues to send the uplink data to the base station in the contention-based manner.

In still another example, the terminal may further receive the timing advance information sent by the base station. The timing advance information is used for uplink synchronization. For example, the timing advance information may be a timing advance command. After receiving the timing advance command, the terminal may adjust uplink transmission timing of the PUCCH, the PUSCH, the SRS, or the like that is of the primary cell or the primary secondary cell, to achieve uplink synchronization. Therefore, a signal transmitted by the terminal and a signal transmitted by another synchronized terminal are mutually orthogonal, and mutual interference can be avoided.

Figure 3:
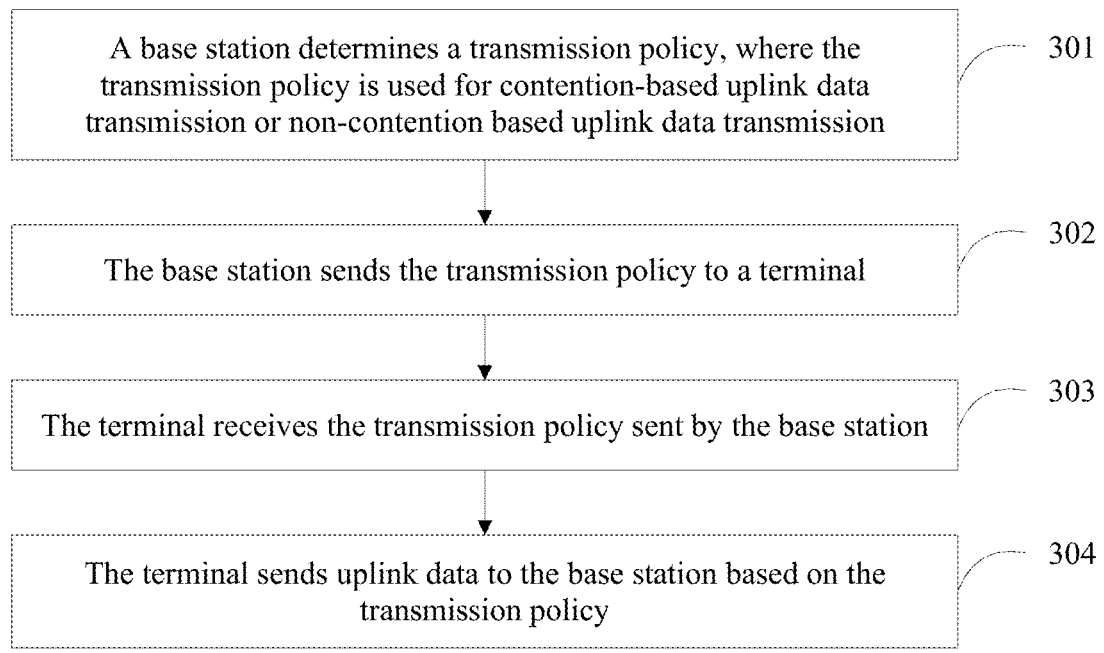
FIG. 3 is a schematic flowchart of a data transmission method according to an embodiment of the present invention.

In the method shown in FIG. 3, the base station can comprehensively consider an actual status of the terminal and an actual status of the network, to determine an appropriate transmission policy and send the transmission policy to the terminal. The terminal can finally determine, based on the transmission policy, to use a contention-based manner or a non-contention based manner to send the uplink data to the base station, so that transmission efficiency is improved.

The following further describes the embodiments of the present invention with reference to more accompanying drawings.

Figure 4A:
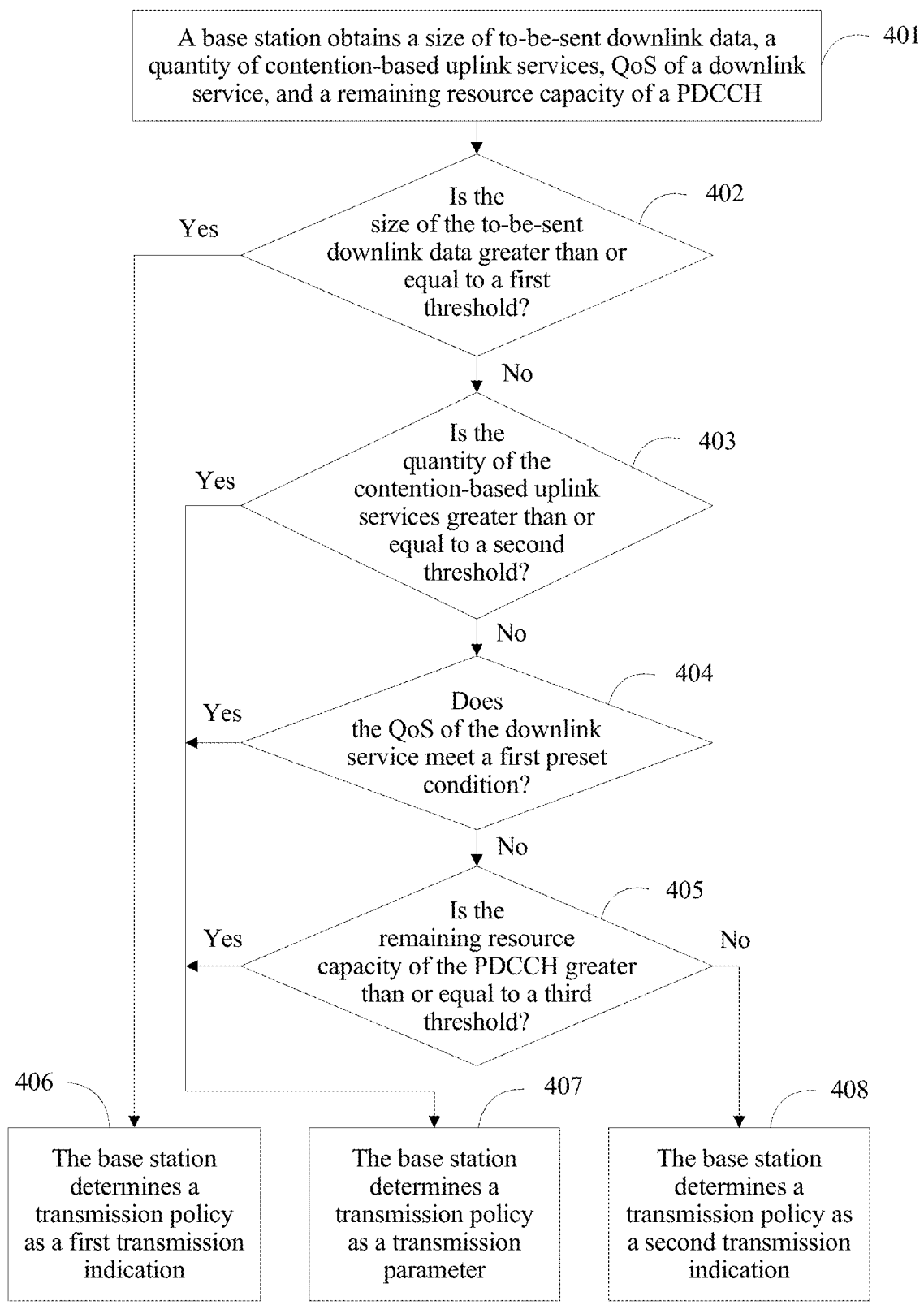
FIG. 4a is a schematic flowchart of a method for determining a transmission policy according to an embodiment of the present invention.
Figure 4B:
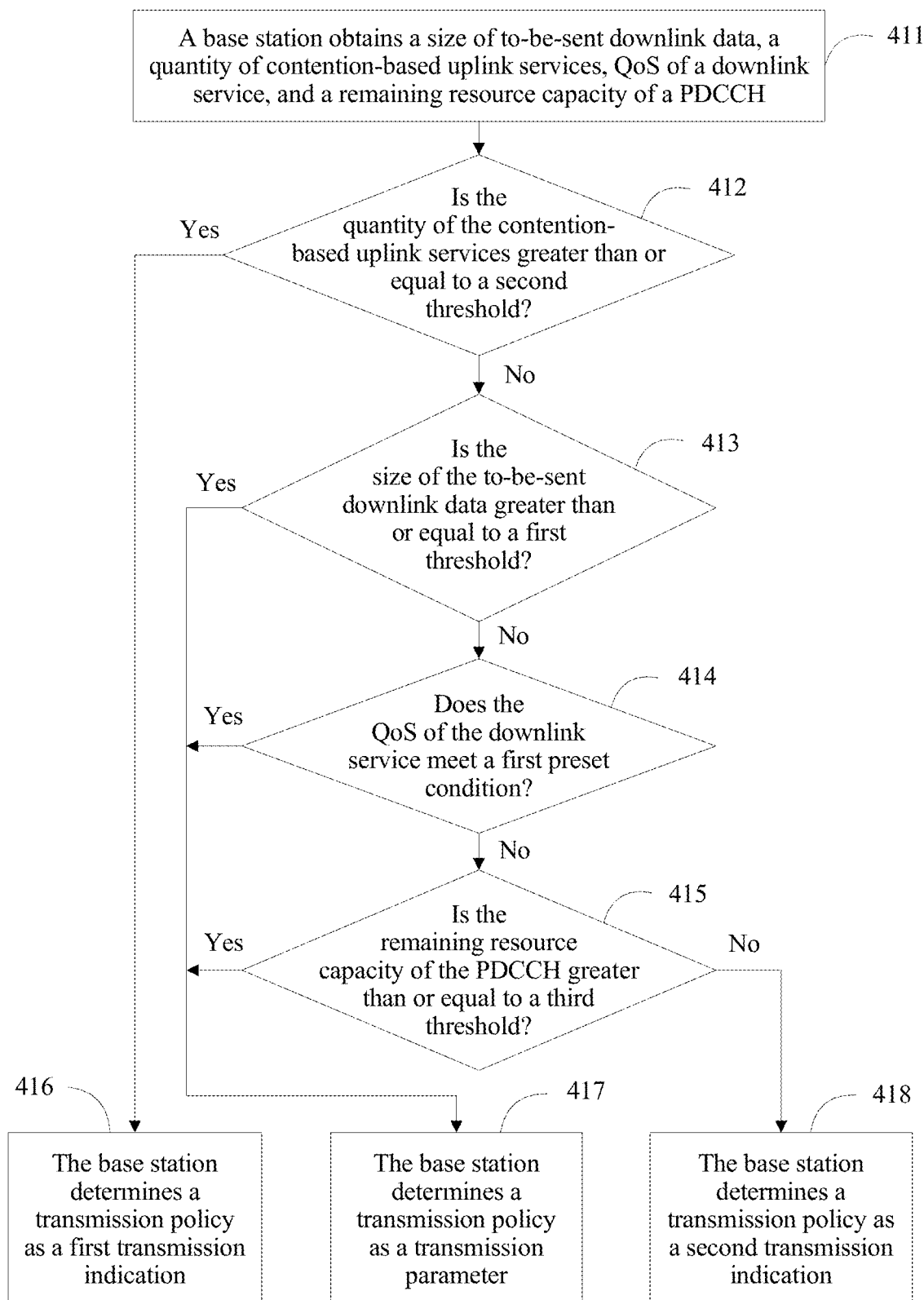
FIG. 4b is a schematic flowchart of another method for determining a transmission policy according to an embodiment of the present invention.

FIG. 4a is a schematic flowchart of a method for determining a transmission policy according to an embodiment of the present invention. In the method shown in FIG. 4a, a base station determines the transmission policy based on a priority order of a size of to-be-sent data, a quantity of contention-based uplink services, QoS of a downlink service, and a remaining resource capacity of a PDCCH. FIG. 4b is a schematic flowchart of another method for determining a transmission policy according to an embodiment of the present invention. In the method shown in FIG. 4b, a base station determines the transmission policy based on a priority order of a quantity of contention-based uplink services, a size of to-be-sent data, QoS of a downlink service, and a remaining resource capacity of a PDCCH. Further and certainly, the base station may alternatively determine the transmission policy based on another priority order or another rule. The method shown in FIG. 4a or FIG. 4b is merely used as an example, and the embodiments of the present invention are not limited to the implementation for determining the transmission policy by the base station based on the foregoing factors. The method shown in FIG. 4a is used as an example for detailed description below. The method shown in FIG. 4b is similar to the method shown in FIG. 4a, and details are not described herein again.

401. The base station obtains the size of the to-be-sent downlink data, the quantity of the contention-based uplink services, the QoS of the downlink service, and the remaining resource capacity of the PDCCH.

402. The base station determines whether the size of the to-be-sent downlink data is greater than or equal to a first threshold; and if the size of the to-be-sent downlink data is greater than or equal to the first threshold, 406 is performed, or if the size of the to-be-sent downlink data is less than the first threshold, 403 is performed.

403. The base station determines whether the quantity of the contention-based uplink services is greater than or equal to a second threshold; and if the quantity of the contention-based uplink services is greater than or equal to the second threshold, 407 is performed, or if the quantity of the contention-based uplink services is less than the second threshold, 404 is performed.

404. The base station determines whether the QoS of the downlink service meets a first preset condition; and if the QoS of the downlink service meets the first preset condition, 407 is performed, or if the QoS of the downlink service does not meet the first preset condition, 405 is performed.

405. The base station determines whether the remaining resource capacity of the PDCCH is greater than or equal to a third threshold; and if the remaining resource capacity of the PDCCH is greater than or equal to the third threshold, 407 is performed, or if the remaining resource capacity of the PDCCH is less than the third threshold, 408 is performed.

406. The base station determines the transmission policy as a first transmission indication.

407. The base station determines the transmission policy as a transmission parameter.

408. The base station determines the transmission policy as a second transmission indication.

In the methods shown in FIG. 4a and FIG. 4b, the base station determines the transmission policy based on the size of the to-be-sent data, the quantity of the contention-based uplink services, the QoS of the downlink service, and the remaining resource capacity of the PDCCH. Therefore, uplink and downlink transmission factors can be comprehensively considered, that is, actual statuses of a terminal and a network are comprehensively considered, so that an appropriate transmission policy is determined, and transmission efficiency is improved. For example, when there is relatively large amount of to-be-sent downlink data or a relatively large quantity of contention-based uplink services, transmission efficiency is higher if a non-contention based manner is used. For another example, when relatively high QoS of a downlink service is required, the non-contention based manner is more appropriate; or when relatively low QoS of a downlink service is required, transmission efficiency is higher if a contention-based manner is used.

Figure 5A:
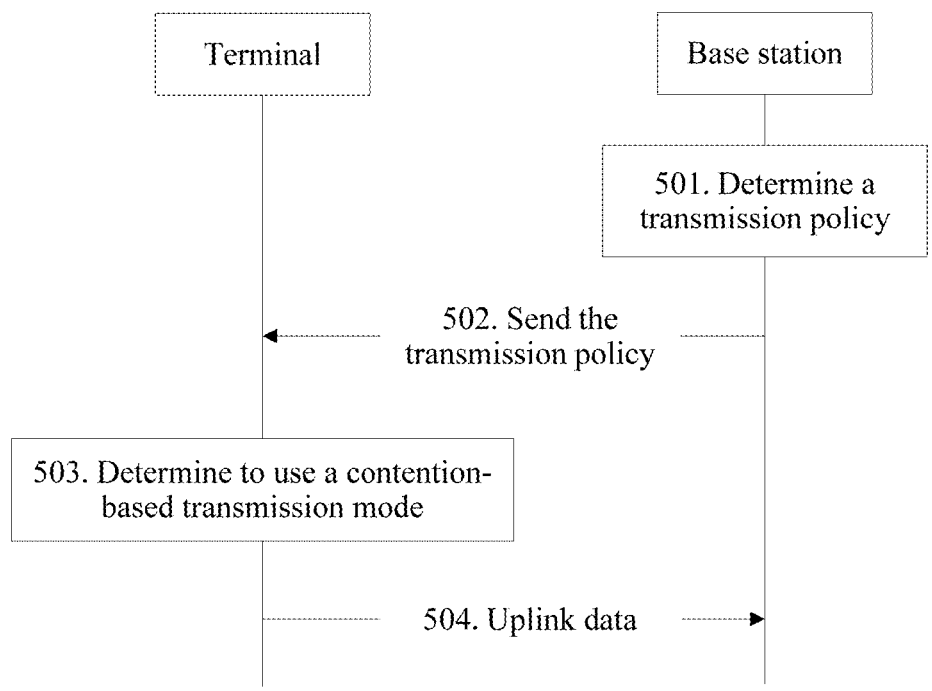
FIG. 5a is a schematic communication diagram of a method for sending uplink data according to an embodiment of the present invention.

FIG. 5a is a schematic communication diagram of a method for sending uplink data according to an embodiment of the present invention. In the method shown in FIG. 5a, a terminal sends the uplink data to a base station in a contention-based manner.

501. The base station determines a transmission policy, where the transmission policy may be a second transmission indication or a transmission parameter. For example, the base station may determine the transmission policy according to 301 in the method shown in FIG. 3 or the method shown in FIG. 4a or FIG. 4b, and details are not described herein again.

502. The base station sends the transmission policy to the terminal. For example, the base station may send the transmission policy to the terminal according to 302 in the method shown in FIG. 3, and details are not described herein again.

503. The terminal receives the transmission policy sent by the base station, and determines, based on the transmission policy, to use the contention-based manner. For example, when the transmission policy is the second transmission indication, the base station may use the contention-based manner based on the second transmission indication. For another example, when the transmission policy is the transmission parameter, the base station may determine, based on the example in 304 in the method shown in FIG. 3, to use the contention-based manner.

504. The terminal sends the uplink data to the base station. For example, the terminal may send the uplink data to the base station in a manner in which a cyclic prefix (CP) is added before the data. Correspondingly, the base station receives the uplink data sent by the terminal. Adding the CP before the uplink data may ensure that a signal of the terminal and a signal of another terminal are orthogonal, so that interference between signals of different terminals is avoided.

Figures 1, 5B:
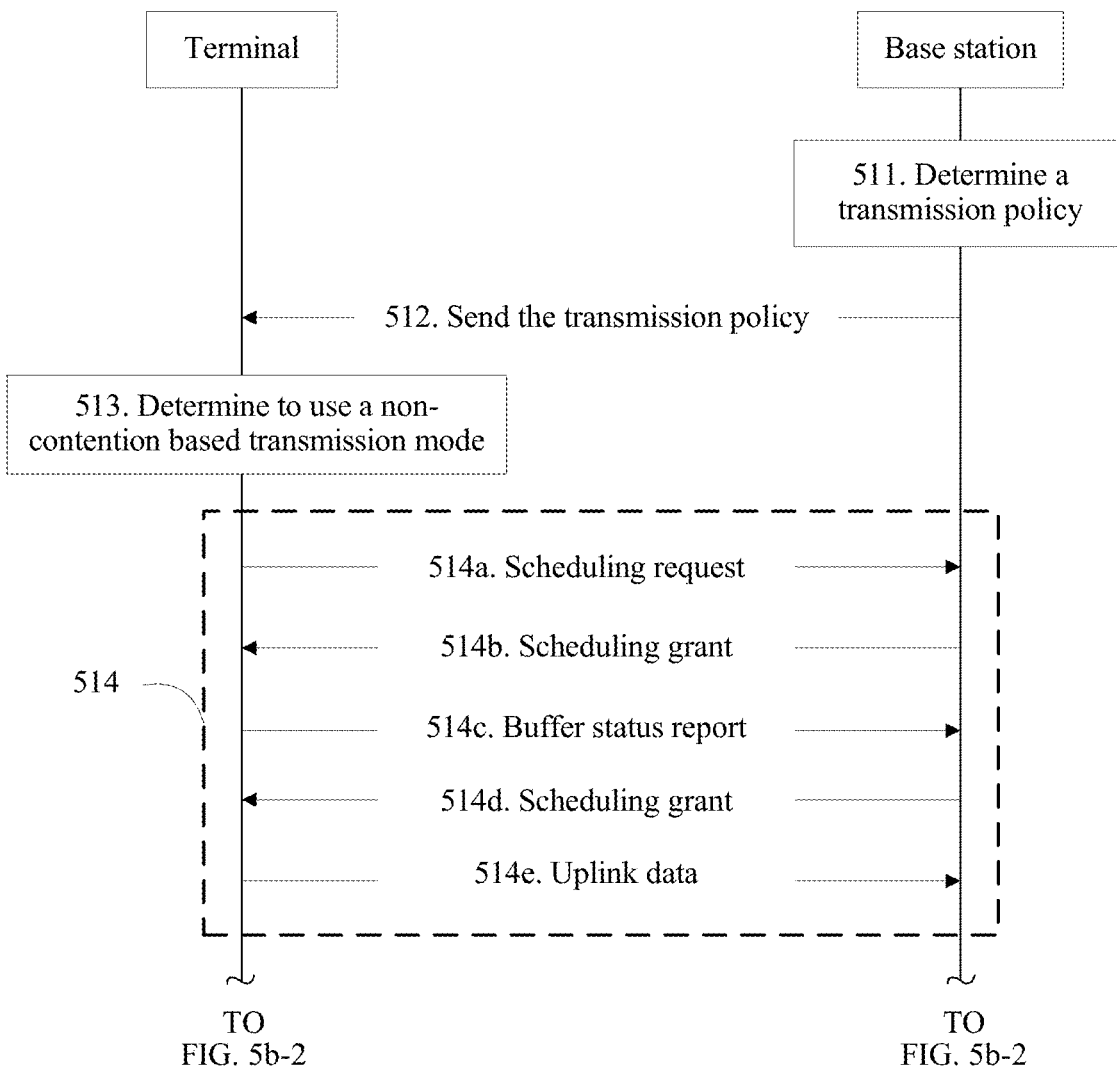
Figures 2, 5B:
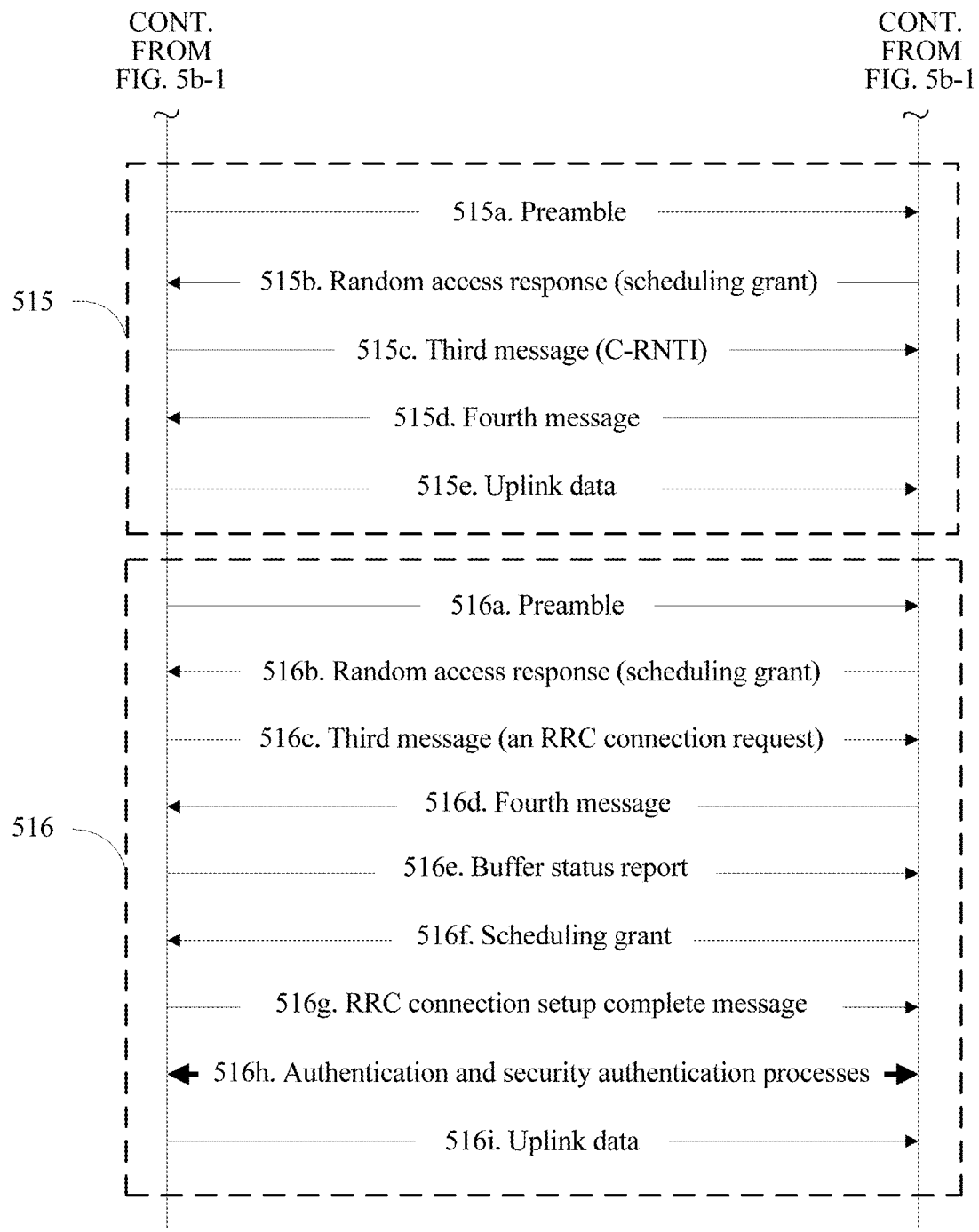

FIG. 5b-1 and FIG. 5b-2 are a schematic communication diagram of another method for sending uplink data according to an embodiment of the present invention. In the method shown in FIG. 5b-1 and FIG. 5b-2, a terminal sends the uplink data to a base station in a non-contention based manner.

511. The base station determines a transmission policy, where the transmission policy may be a first transmission indication or a transmission parameter. For example, the base station may determine the transmission policy according to 301 in the method shown in FIG. 3 or the method shown in FIG. 4a or FIG. 4b, and details are not described herein again.

512. The base station sends the transmission policy to the terminal. For example, the base station may send the transmission policy to the terminal according to 302 in the method shown in FIG. 3, and details are not described herein again.

513. The terminal receives the transmission policy sent by the base station, and determines, based on the transmission policy, to use the non-contention based manner. For example, when the transmission policy is the first transmission indication, the base station may use the non-contention based manner based on the first transmission indication. For another example, when the transmission policy is the transmission parameter, the base station may determine, based on the example in 304 in the method shown in FIG. 3, to use the non-contention based manner.

After the non-contention based manner is determined, a manner of sending the uplink data based on a status of the terminal is as follows: When the terminal is a terminal in synchronized mode, 514 is performed; or when the terminal is a terminal in non-synchronized mode, 515 is performed; or when the terminal is a terminal in idle mode, 516 is performed.

514 includes 514a to 514e:

514a. The terminal sends a scheduling request (SR) to the base station, to request non-contention based uplink transmission.

514b. The base station sends a scheduling grant (SG) to the terminal after receiving the SR sent by the terminal. For example, the base station may allocate some resources by using the SG.

514c. The terminal sends a buffer status report (BSR) to the base station after receiving the SG sent by the base station.

514d. The base station sends an SG to the terminal after receiving the BSR sent by the terminal. The base station learns, based on the BSR sent by the terminal, a resource size required by the terminal, and allocates, based on the SG, the resource described by the terminal to the terminal.

514e. The terminal sends the uplink data to the base station after receiving the SG sent by the base station. Correspondingly, the base station receives the uplink data sent by the terminal.

515 includes 515a to 515e:

515a. The terminal sends a preamble to the base station.

515b. The base station sends an RAR to the terminal after receiving the preamble sent by the terminal, where the RAR carries an SG.

515c. The terminal sends a third message (MSG3) to the base station after receiving the RAR sent by the base station, where the MSG3 carries a cell radio network temporary identifier (C-RNTI).

515d. The base station sends a fourth message (MSG4) to the terminal after receiving the MSG3 sent by the terminal.

515e. The terminal sends the uplink data to the base station after receiving the MSG4 sent by the base station. Correspondingly, the base station receives the uplink data sent by the terminal.

516 includes 516a to 516i:

516a. The terminal sends a preamble to the base station.

516b. The base station sends an RAR to the terminal after receiving the preamble sent by the terminal, where the RAR carries an SG.

516c. The terminal sends an MSG3 to the base station after receiving the RAR sent by the base station, where the MSG3 carries an RRC connection request.

516d. The base station sends an MSG4 to the terminal after receiving the RAR sent by the terminal.

516e. The terminal sends a BSR to the base station after receiving the MSG4 sent by the base station.

516f. The base station sends an SG to the terminal after receiving the BSR sent by the terminal.

516g. The terminal sends an RRC connection setup complete message to the base station after receiving the SG sent by the base station. Correspondingly, the base station receives the RRC connection setup complete message sent by the terminal.

516h. The terminal and the base station perform authentication and security authentication.

516i. The terminal sends the uplink data to the base station. Correspondingly, the base station receives the uplink data sent by the terminal.

Figure 6:
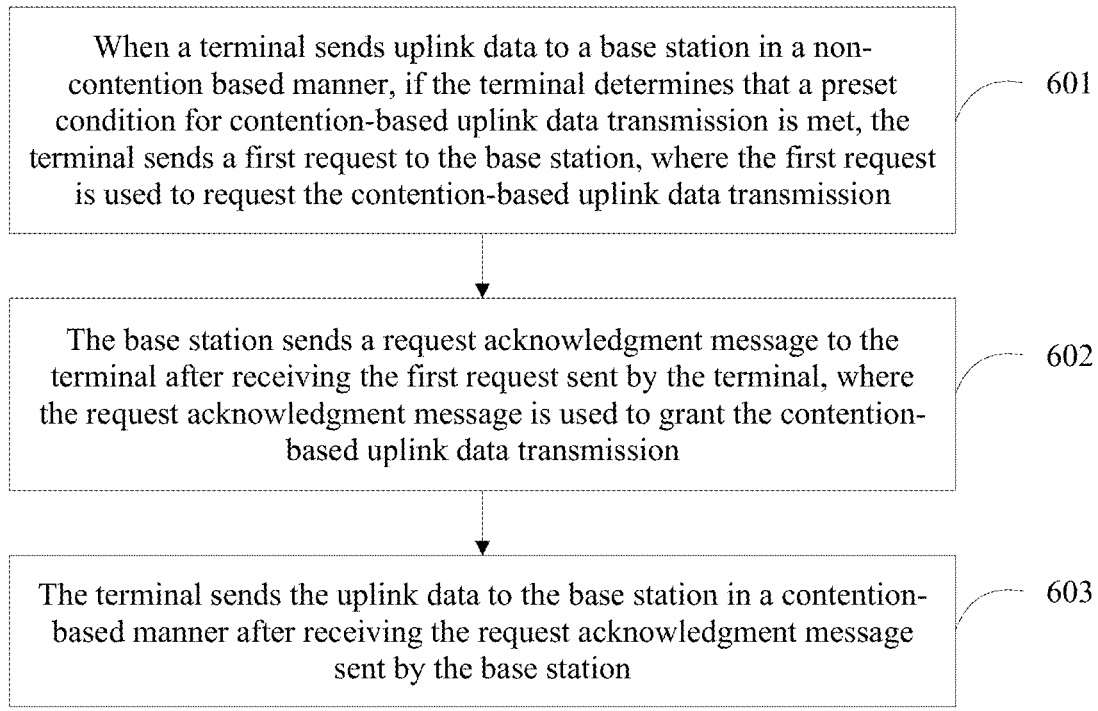
FIG. 6 is a schematic flowchart of another data transmission method according to an embodiment of the present invention.

FIG. 6 is a schematic flowchart of another data transmission method according to an embodiment of the present invention. The method shown in FIG. 6 provides a solution to switching from non-contention based uplink data transmission to contention-based uplink data transmission. In the solution shown in FIG. 6, when a terminal needs to switch from a non-contention based manner to a contention-based manner, for example, when an amount of data of an uplink service is excessively small and the contention-based manner is more appropriate, a base station can respond in time, so that transmission efficiency is improved.

601. When the terminal sends uplink data to the base station in the non-contention based manner, if the terminal determines that a preset condition for the contention-based uplink data transmission is met, the terminal sends a first request to the base station, where the first request is used to request the contention-based uplink data transmission. For example, the first request may be a non-scheduling request, and the terminal may send the non-scheduling request to the base station by using a PUCCH, a PUSCH, or an MCE message. It should be noted that "when the terminal sends uplink data to the base station in the non-contention based manner" means that within a time period during which the terminal uses the non-contention based uplink data transmission, there may be data being transmitted currently, or there may be no data being transmitted. This embodiment of the present invention is not limited to a case in which the uplink data is being sent at a current moment.

In an example, the terminal may determine, based on at least one of signal quality of the terminal, a location of the terminal, a size of to-be-sent uplink data, and a sparseness degree of a service, that the preset condition for the contention-based uplink data transmission is met. A specific determining manner is not limited in this embodiment of the present invention.

602. The base station sends a request acknowledgment message to the terminal after receiving the first request sent by the terminal, where the request acknowledgment message is used to grant the contention-based uplink data transmission. For example, the request acknowledgment message may be a non-scheduling request acknowledgment message, and the base station may send the non-scheduling request acknowledgment message to the terminal by using the MCE message.

603. The terminal sends the uplink data to the base station in the contention-based manner after receiving the request acknowledgment message sent by the base station. For example, after receiving the non-scheduling request acknowledgment message and determining that no current retransmission data needs to be sent, the terminal sends the uplink data to the base station in the contention-based manner.

It should be noted that the method shown in FIG. 6 may be performed after the method shown in FIG. 3 is performed, or may be initially performed when the method shown in FIG. 3 is not performed.

Figure 7:
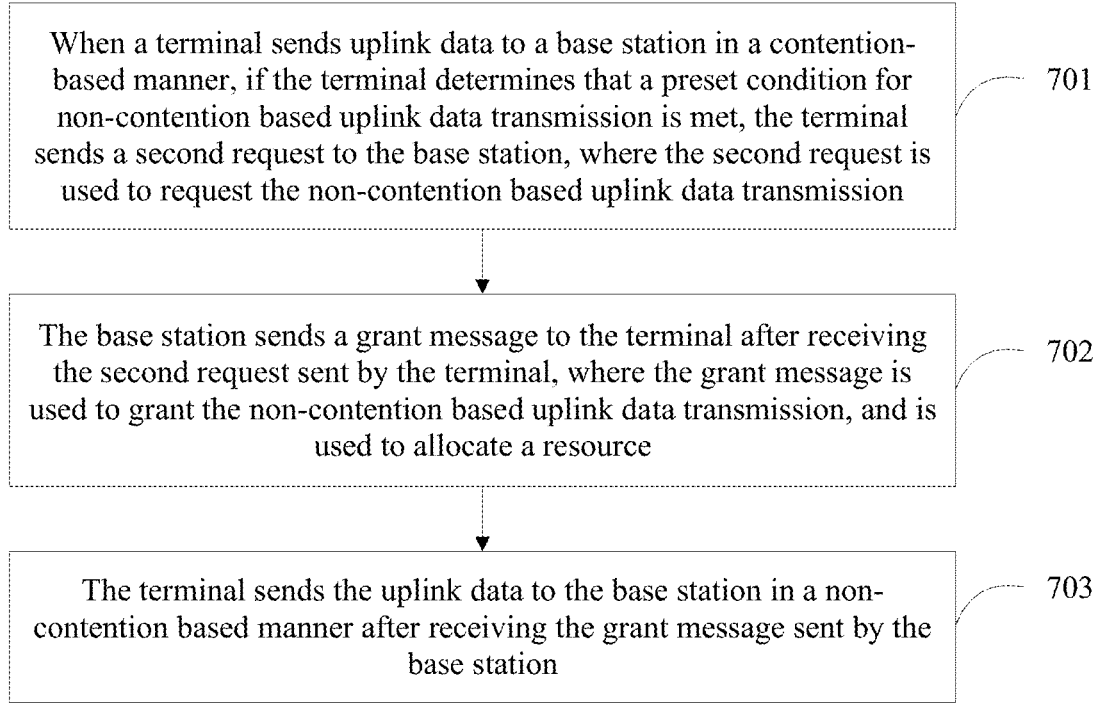
FIG. 7 is a schematic flowchart of still another data transmission method according to an embodiment of the present invention.

FIG. 7 is a schematic flowchart of yet another data transmission method according to an embodiment of the present invention. The method shown in FIG. 7 provides a solution to switching from contention-based uplink data transmission to non-contention based uplink data transmission. When a terminal needs to switch from a contention-based manner to a non-contention based manner, for example, when an amount of data of an uplink service is excessively large and the non-contention based manner is more appropriate, in the solution shown in FIG. 7, the terminal can send uplink data without a need of completing all processes of the non-contention based uplink data transmission, so that a time of waiting for a grant by the terminal can be shortened.

701. When the terminal sends uplink data to a base station in the contention-based manner, if the terminal determines that a preset condition for the non-contention based uplink data transmission is met, the terminal sends a second request to the base station, where the second request is used to request the non-contention based uplink data transmission. For example, the second request may be an SG and the terminal may send the SG to the base station by using a PUCCH, a PUSCH, or an MCE message. It should be noted that "when the terminal sends uplink data to a base station in the contention-based manner" means that within a time period during which the terminal uses the contention-based uplink data transmission, there may be data being transmitted currently, or there may be no data being transmitted. This embodiment of the present invention is not limited to a case in which the uplink data is being sent at a current moment.

In an example, the terminal may determine, based on at least one of signal quality of the terminal, a location of the terminal, a size of to-be-sent uplink data, and a sparseness degree of a service, that the preset condition for the non-contention based uplink data transmission is met. A specific determining manner is not limited in this embodiment of the present invention.

In another example, when sending the second request to the base station, the terminal may further synchronously send a BSR to the base station, where the BSR is used to notify the base station of a size of buffered data of a current uplink service, so that the base station can allocate an uplink resource.

In still another example, if the terminal determines that the preset condition for the non-contention based uplink data transmission is met, the terminal does not send the second request to the base station, but sends only the BSR to the base station. In this case, the BSR is used to notify that base station of the size of the buffered data of the current uplink service, and is further used to request the non-contention based uplink data transmission.

In still another example, after sending the second request to the base station, the terminal does not send new data to the base station, and may enable a timer that is used to wait for the base station to grant the non-contention based uplink data transmission. Certainly, during a time period before the base station performs the granting, the terminal may re-send data that is previously sent.

702. The base station sends a grant message to the terminal after receiving the second request sent by the terminal, where the grant message is used to grant the non-contention based uplink data transmission, and is used to allocate a resource.

In an example, the base station may not send the grant message to the terminal, but sends some parameters or information to the terminal. For example, the parameters or the information may be carried in a broadcast message, RRC signaling, an MCE message, or a PDCCH, and is used to notify the terminal that if the terminal continuously sends several data packets to the base station within a specified time period, after the specified time period expires, the terminal may switch to the non-contention based manner to send the uplink data to the base station. The several data packets may be several data packets carrying same content, or may be several data packets separately carrying specified content, or may be several data packets meeting another condition.

In another example, if the terminal is a terminal in idle mode or non-synchronized mode, the base station may further send timing advance information to the terminal; for example, the base station may send the timing advance information to the terminal by using a PDCCH or a timing advance command MCE message. If the terminal is a terminal in synchronized mode, the base station may not send the timing advance information to the terminal. Certainly, the base station may also send the timing advance information to the terminal in synchronized mode, for example, when the timing advance information is changed, the base station sends the timing advance information to the terminal in the synchronized mode.

703. The terminal sends the uplink data to the base station in the non-contention based manner after receiving the grant message sent by the base station. If the terminal does not send the BSR to the base station in 701, the terminal further sends the BSR to the base station.

In an example, if the terminal receives, before the timer expires, the grant message sent by the base station, the terminal sends the uplink data to the base station in the non-contention based manner. If the terminal further receives, before the timer expires, the timing advance information sent by the base station, the terminal may further send the uplink data to the base station in the non-contention based manner based on the timing advance information. Data that fails to be sent in the contention-based manner previously may also be sent in the non-contention based manner, for example, the data may be combined and sent by using a hybrid automatic repeat request (HARQ for short).

In still another example, if the terminal is a terminal in idle mode, after receiving the grant message sent by the base station, the terminal needs to complete authentication and security authentication processes with the base station, and then sends the uplink data to the base station in the non-contention based manner.

It should be noted that the method shown in FIG. 7 may be performed after the method shown in FIG. 3 is performed, or may be initially performed when the method shown in FIG. 7 is not performed.

Figure 8:
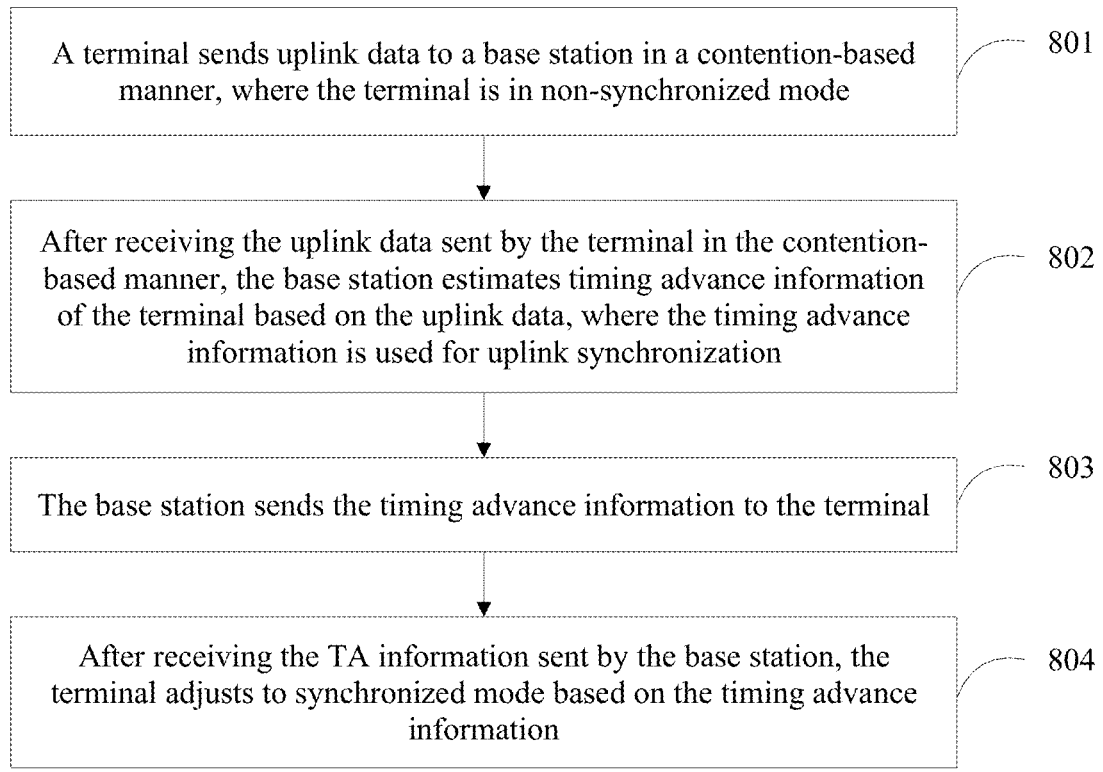
FIG. 8 is a schematic flowchart of yet another data transmission method according to an embodiment of the present invention.

FIG. 8 is a schematic flowchart of yet another data transmission method according to an embodiment of the present invention.

801. A terminal sends uplink data to a base station in a contention-based manner, where the terminal is in non-synchronized mode.

802. After receiving the uplink data sent by the terminal in the contention-based manner, the base station estimates timing advance information of the terminal based on the uplink data, where the timing advance information is used for uplink synchronization.

803. The base station sends the timing advance information to the terminal.

804. The terminal adjusts to synchronized mode based on the timing advance information after receiving the timing advance information sent by the base station.

It should be noted that the method shown in FIG. 8 may be performed after the method shown in FIG. 3 or FIG. 6 is performed, or may be initially performed when the method shown in FIG. 3 or FIG. 6 is not performed.

When the terminal sends the uplink data to the base station in the contention-based manner, the terminal usually sends the uplink data by adding a CP before the uplink data. When the terminal is in non-synchronized mode, a length of the CP is greater than a length of a CP when the terminal is in synchronized mode. In the solution in this embodiment of the present invention, a status of the terminal can be adjusted to synchronized mode, so that contention resource utilization is improved.

Figure 9A:
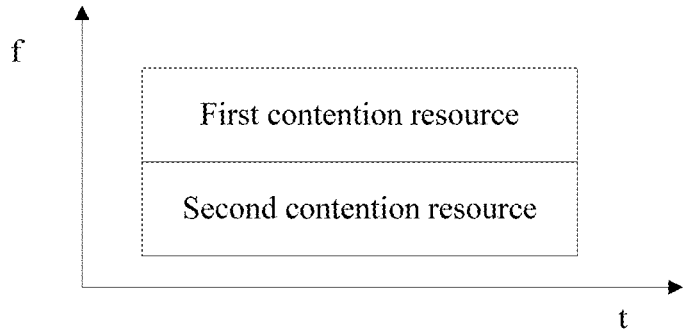
FIGS. 9a to 9c are schematic diagrams of contention resources according to an embodiment of the present invention.
Figure 9B:
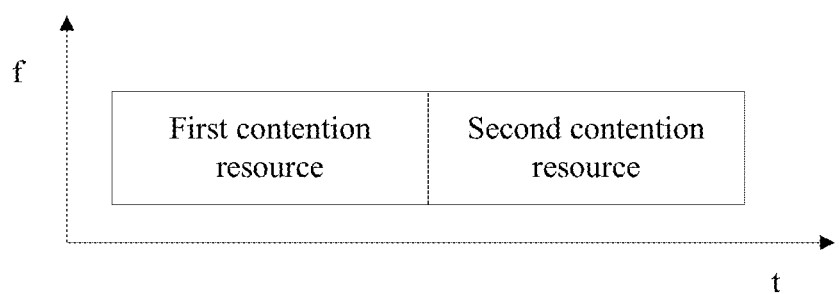
Figure 9C:
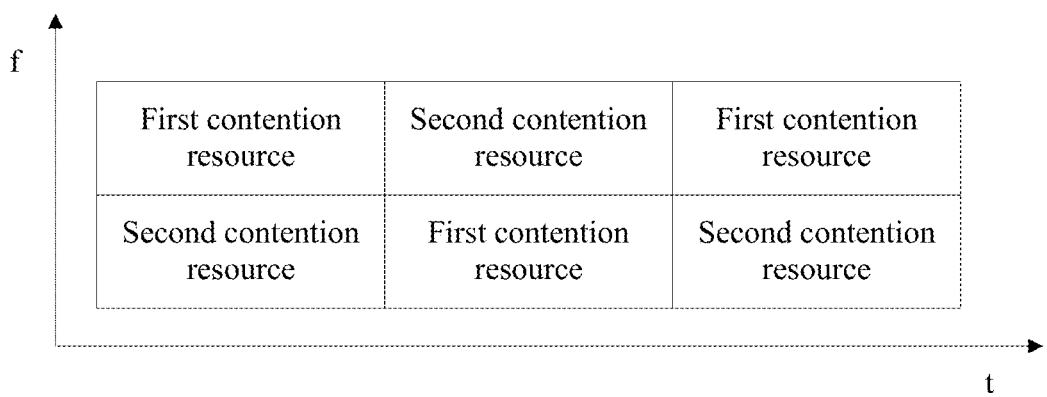

In the foregoing solution provided in this embodiment of the present invention, when the terminals send the uplink data to the base station in the contention-based manner, the terminals in different statuses may use different contention resources; for example, a terminal in synchronized mode uses a first contention resource, and a terminal in non-synchronized mode or idle mode uses a second contention resource. Alternatively, the terminals in different statuses may also determine to use the first contention resource or the second contention resource by considering a status of a resource. A multiplexing manner of the first contention resource and the second contention resource may be frequency division multiplexing, or may be time division multiplexing, or may be frequency division multiplexing and time division multiplexing at the same time. For example, as shown in FIG. 9a, the first contention resource and the second contention resource are used in the frequency division multiplexing manner. For another example, as shown in FIG. 9b, the first contention resource and the second contention resource are used in time division multiplexing manner. For another example, as shown in FIG. 9c, the first contention resource and the second contention resource are used in both the frequency division multiplexing manner and the time division multiplexing manner.

Figure 10:
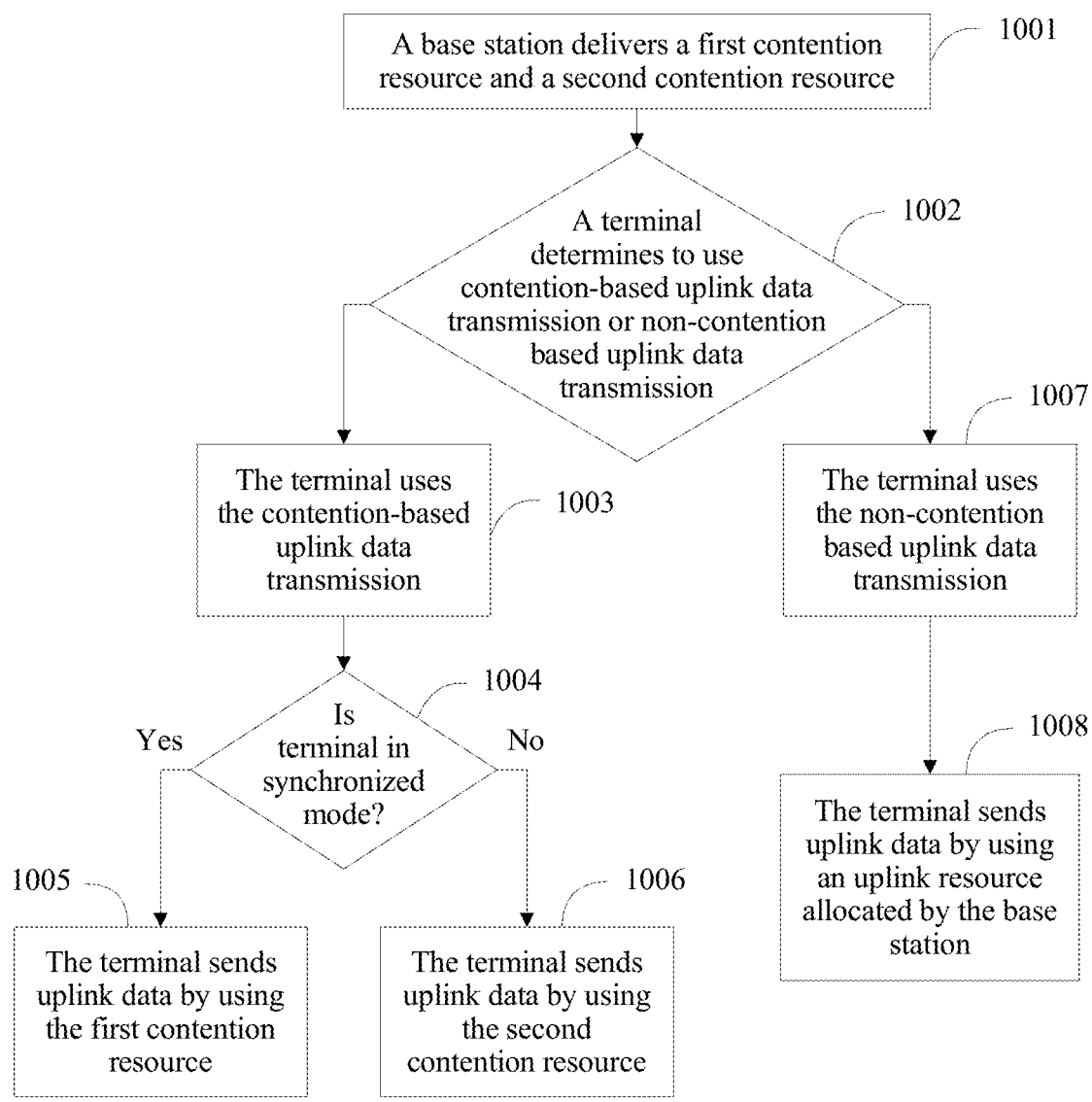
FIG. 10 is a schematic flowchart of still another method for sending uplink data according to an embodiment of the present invention.

FIG. 10 is a schematic flowchart of still another method for sending uplink data according to an embodiment of the present invention.

1001. A base station delivers a first contention resource and a second contention resource. For a multiplexing manner of the first contention resource and the second contention resource, refer to the manners shown in FIGS. 9a to 9c.

1002. A terminal determines to use contention-based uplink data transmission or non-contention based uplink data transmission. For example, the terminal determines the transmission policy by using the method shown in FIG. 3, FIG. 6, or FIG. 7. If the terminal determines to use the contention-based uplink data transmission, 1003 is performed; or if the terminal determines to use the non-contention based uplink data transmission, 1007 is performed.

1003. The terminal uses the contention-based uplink data transmission.

1004. Determine whether the terminal is in synchronized mode; and if the terminal is in the synchronized mode, 1005 is performed, or if the terminal is not in the synchronized mode, 1006 is performed.

1005. The terminal sends uplink data to the base station in a contention-based manner by using the first contention resource.

1006. The terminal sends uplink data to the base station in a contention-based manner by using the second contention resource.

1007. The terminal uses the non-contention based uplink data transmission.

1008. The terminal sends uplink data to the base station in a non-contention based manner by using an uplink resource allocated by the base station.

In the method shown in FIG. 10, different terminals in synchronized mode contend for the first contention resource, and different terminals in non-synchronized mode contend for the second contention resource, so that it can be ensured that signals of terminals in different statuses are orthogonal, to avoid interference between the signals of terminals in different statuses.

The foregoing has mainly described the solutions provided in the embodiments of the present invention from a perspective of interaction between the base station and the terminal. It should be noted that the base station is an example of the foregoing network side device, and functions of the base station related to the foregoing method can be implemented by another possible network side device. It may be understood that to implement the foregoing functions, the network side device, such as the base station, and the terminal device include corresponding hardware structures and/or software structures for performing the functions. A person skilled in the art should be easily aware that, units and algorithm steps in each example described with reference to the embodiments disclosed in the present invention can be implemented by hardware or a combination of hardware and computer software in the present invention. Whether a function is performed by hardware or hardware driven by computer software depends on particular applications and design constraints of the technical solutions. A person in the art may use different methods to implement the described functions for each particular application, but it should not be considered that the implementation goes beyond the scope of the present invention.

Figure 11:
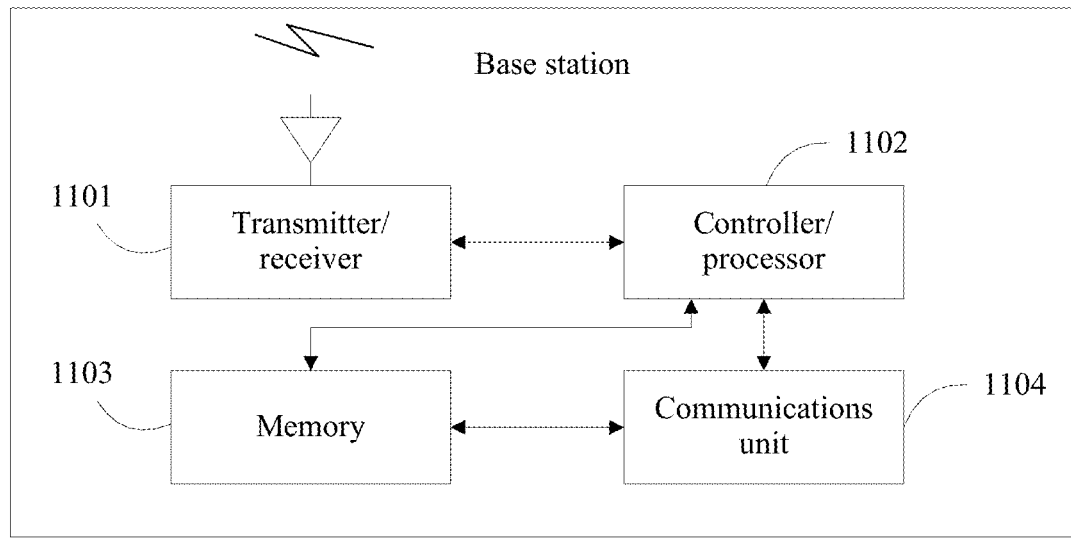
FIG. 11 is a schematic structural diagram of a base station according to an embodiment of the present invention.

FIG. 11 is a possible schematic structural diagram of a base station related to the foregoing embodiment.

The base station includes a transmitter/receiver 1101, a controller/processor 1102, a memory 1103, and a communications unit 1104. The transmitter/receiver 1101 is configured to: support the base station in sending/receiving information to/from the terminal in the foregoing embodiment, and support the terminal in performing wireless communication with another terminal. The controller/processor 1102 performs various functions for communicating with the terminal. In an uplink, an uplink signal from the terminal is received by an antenna, demodulated by the receiver 1101, and further processed by the controller/processor 1102, so as to restore service data and signaling information that are sent by the terminal. In a downlink, service data and a signaling message are processed by the controller/processor 1102 and demodulated by the transmitter 1101, so as to generate a downlink signal, and the downlink signal is transmitted to the terminal by using the antenna. The controller/processor 1102 further performs the base station-related processing processes in FIG. 3 to FIG. 8 and/or is configured to perform another process of the technical solution described in this application. In an example, the controller/processor 1102 is configured to support the base station in performing processes 301 and 302 in FIG. 3, processes 401 to 408 in FIG. 4a, processes 411 to 418 in FIG. 4b, processes 501 and 502 in FIG. 5a, processes 511, 512, 514b, 514d, 515b, 515d, 516b, 516d, 516f, and 516h in FIG. 5b-1 and FIG. 5b-2, the process 602 in FIG. 6, the process 702 in FIG. 7, and processes 802 and 803 in FIG. 8. The memory 1103 is configured to store program code and data of the base station. The communications unit 1104 is configured to support the base station in communicating with another network entity.

It may be understood that FIG. 11 shows merely a simplified design of a base station. In actual application, the base station may include any quantity of transmitters, receivers, processors, controllers, memories, communications units, and the like, and all base stations that can implement the present invention fall within the protection scope of the present invention.

Figure 12:
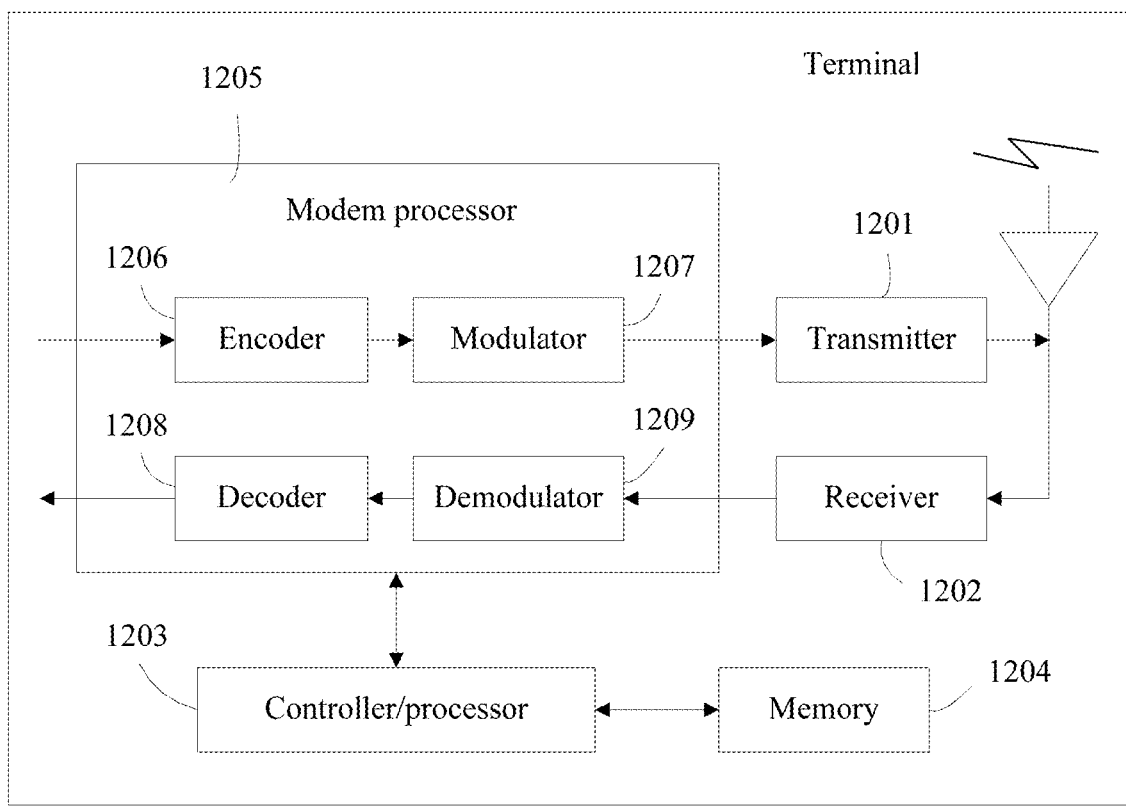
FIG. 12 a schematic structural diagram of a terminal according to an embodiment of the present invention.

FIG. 12 is a simplified schematic diagram of a possible design structure of a terminal in the foregoing embodiment. The terminal includes a transmitter 1201, a receiver 1202, a controller/processor 1203, a memory 1204, and a modem processor 1205.

The transmitter 1201 adjusts (for example, through analog conversion, filtering, amplification, and up-conversion) an output sample, and generates an uplink signal. The uplink signal is transmitted to the base station in the foregoing embodiment by an antenna. In a downlink, the antenna receives a downlink signal transmitted by the base station in the foregoing embodiment. The receiver 1202 adjusts (for example, through filtering, amplification, down-conversion, and digitization) a signal received from the antenna, and provides an input sample. In the modem processor 1205, an encoder 1206 receives service data and a signaling message that are to be sent in an uplink, and processes (for example, through formatting, encoding, and interleaving) the service data and the signaling message. A modulator 1207 further processes (for example, through symbol mapping and modulation) service data and a signaling message that are encoded, and provides an output sample. A demodulator 1209 processes (for example, through demodulation) the input sample, and provides symbol estimation. A decoder 1208 processes (for example, through de-interleaving and decoding) the symbol estimation, and provides decoded data and a decoded signaling message that are sent to the terminal. The encoder 1206, the modulator 1207, the demodulator 1209, and the decoder 1208 may be implemented by the composite modem processor 1205. These units perform processing based on a radio access technology (for example, an access technology in LTE or another evolved system) used by a radio access network.

The controller/processor 1203 controls and manages an action of the terminal, and is configured to perform processing performed by the terminal in the foregoing embodiment. For example, the controller/processor 1203 is configured to control the terminal to determine, based on a received transmission policy, to use a contention-based uplink data transmission or a non-contention based uplink data transmission, and/or perform another process of the technical solutions described in the present invention. In an example, the controller/processor 1203 is configured to support the terminal in performing processes 303 and 304 in FIG. 3, processes 503 and 504 in FIG. 5a, processes 513, 514a, 514c, 514e, 515a, 515c, 515e, 516a, 516c, 516e, 516g, 516h, and 516i in FIG. 5b-1 and FIG. 5b-2, processes 601 and 603 in FIG. 6, processes 701 and 703 in FIG. 7, and processes 801 and 804 in FIG. 8. The memory 1204 is configured to store program code and data for the terminal.

The controller/processor configured to perform functions of the base station or the terminal in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware assembly, or any combination thereof. The controller/processor may implement or execute various example logical blocks, modules, and circuits described with reference to content disclosed in the present invention. Alternatively, the processor may be a combination of processors implementing a computing function, for example, one microprocessor or a combination of more than one microprocessor, or a combination of the DSP and a microprocessor.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in the base station or the terminal. Certainly, the processor and the storage medium may also be located in the base station or the terminal as discrete assemblies.

A person of skill in the art should be aware that in one or more of the foregoing examples, the functions described in the present invention may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

What is claimed is:

1. A data transmission method, comprising:
   determining, by a base station, a transmission policy, wherein the transmission policy indicates contention-based uplink data transmission or non-contention based uplink data transmission; and
   sending, by the base station, the transmission policy to a terminal,
   wherein the determining, by a base station, a transmission policy comprises:

determining, by the base station, the transmission policy based on:
  a size of to-be-sent downlink data;
  a quantity of contention-based uplink services;
  quality of service (QoS) of a downlink service; or
  a remaining resource capacity of a physical downlink control channel (PDCCH).

2. The method according to claim 1, wherein:
when any one or any combination of the following conditions is met:
  the size of the to-be-sent downlink data is greater than or equal to a first threshold;
  the quantity of the contention-based uplink services is greater than or equal to a second threshold;
  the remaining resource capacity of the PDCCH is greater than or equal to a third threshold; and
  the QoS of the downlink service meets a first preset condition;
determining, by the base station, the transmission policy indicating the non-contention based uplink data transmission; or
when any one or any combination of the following conditions is met:
  the size of the to-be-sent downlink data is less than a fourth threshold;
  the quantity of the contention-based uplink services is less than a fifth threshold;
  the remaining resource capacity of the PDCCH is less than a sixth threshold; and
  the QoS of the downlink service does not meet a second preset condition;
determining, by the base station, the transmission policy indicating the contention-based uplink data transmission.

3. The method according to claim 1, wherein:
when the transmission policy indicates non-contention based uplink data transmission, the method further comprises:
  receiving, by the base station, a first request from the terminal, wherein the first request is used to request the contention-based uplink data transmission;
  sending, by the base station, a request acknowledgment message to the terminal, wherein the request acknowledgment message is used to grant the contention-based uplink data transmission; and
  receiving, by the base station, uplink data from the terminal in a contention-based manner; or
when the transmission policy indicates contention-based uplink data transmission, the method further comprises:
  receiving, by the base station, a second request from the terminal, wherein the second request is used to request the non-contention based uplink data transmission;
  sending, by the base station, a grant message to the terminal, wherein the grant message is used to grant the non-contention based uplink data transmission, and is used to allocate a resource; and
  receiving, by the base station, uplink data form the terminal in a non-contention based manner.

4. The method according to claim 3, wherein when the transmission policy indicates contention-based uplink data transmission, the method further comprises:
  sending, by the base station, timing advance information to the terminal, wherein the timing advance information is used for uplink synchronization.

5. A data transmission method, comprising:
  receiving, by a terminal, a transmission policy from a base station, wherein the transmission policy indicates contention-based uplink data transmission or non-contention based uplink data transmission; and
  sending, by the terminal, uplink data to the base station based on the transmission policy;
  wherein the transmission policy is determined based on:
  a size of to-be-sent downlink data;
  a quantity of contention-based uplink services;
  quality of service (QoS) of a downlink service; or
  a remaining resource capacity of a physical downlink control channel (PDCCH).

6. The method according to claim 5, wherein:
the sending, by the terminal, uplink data to the base station based on the transmission policy comprises:
  when the transmission policy indicates non-contention based uplink data transmission, sending, by the terminal, the uplink data to the base station in a non-contention based manner; or
  when the transmission policy indicates contention-based uplink data transmission, sending, by the terminal, the uplink data to the base station in a contention-based manner.

7. The method according to claim 5, wherein:
when the transmission policy indicates non-contention based uplink data transmission, the method further comprises:
  if the terminal determines that a preset condition for the contention-based uplink data transmission is met, sending, by the terminal, a first request to the base station, wherein the first request is used to request the contention-based uplink data transmission;
  receiving, by the terminal, a request acknowledgment message from the base station, wherein the request acknowledgment message is used to grant the contention-based uplink data transmission; and
  sending, by the terminal, the uplink data to the base station in a contention-based manner; or
when the transmission policy indicates contention-based uplink data transmission, the method further comprises:
  if the terminal determines that a preset condition for the non-contention based uplink data transmission is met, sending, by the terminal, a second request to the base station, wherein the second request is used to request the non-contention based uplink data transmission;
  receiving, by the terminal, a grant message from the base station, wherein the grant message is used to grant the non-contention based uplink data transmission, and is used to allocate a resource; and
  sending, by the terminal, the uplink data to the base station in a non-contention based manner.

8. The method according to claim 7, wherein when the terminal sends the uplink data to the base station in the contention-based manner, the method further comprises:
  receiving, by the terminal, timing advance information from the base station, wherein the timing advance information is used for uplink synchronization.

9. A base station, comprising:
  at least one processor, configured to determine a transmission policy, wherein the transmission policy indicates contention-based uplink data transmission or non-contention based uplink data transmission; and
  a transmitter, configured to send the transmission policy to a terminal;
  wherein the determining, by a base station, a transmission policy comprises:

determining, by the base station, the transmission policy based on:
   a size of to-be-sent downlink data;
   a quantity of contention-based uplink services;
   quality of service (QoS) of a downlink service; or
   a remaining resource capacity of a physical downlink control channel (PDCCH).

10. The base station according to claim 9, wherein:
the at least one processor is specifically configured to:
   when any one or any combination of the following conditions is met:
      the size of the to-be-sent downlink data is greater than or equal to a first threshold;
      the quantity of the contention-based uplink services is greater than or equal to a second threshold;
      the remaining resource capacity of the PDCCH is greater than or equal to a third threshold; and
      the QoS of the downlink service meets a first preset condition;
   determine the transmission policy indicating the non-contention based uplink data transmission; or
   when any one or any combination of the following conditions is met:
      the size of the to-be-sent downlink data is less than a fourth threshold;
      the quantity of the contention-based uplink services is less than a fifth threshold;
      the remaining resource capacity of the PDCCH is less than a sixth threshold; and
      the QoS of the downlink service does not meet a second preset condition;
   determine the transmission policy indicating the contention-based uplink data transmission.

11. The base station according to claim 9, wherein the base station further comprises a receiver; and
   when the transmission policy indicates non-contention based uplink data transmission,
      the receiver is configured to receive a first request from the terminal, wherein the first request is used to request the contention-based uplink data transmission;
      the transmitter is further configured to send a request acknowledgment message to the terminal after the receiver receives the first request, wherein the request acknowledgment message is used to grant the contention-based uplink data transmission; and
      the receiver is further configured to: receive uplink data from the terminal in a contention-based manner; or
   when the transmission policy indicates contention-based uplink data transmission,
      the receiver is configured to receive a second request from the terminal, wherein the second request is used to request the non-contention based uplink data transmission;
      the transmitter is further configured to send a grant message to the terminal after the receiver receives the first request, wherein the grant message is used to grant the non-contention based uplink data transmission, and is used to allocate a resource; and
      the receiver is further configured to receive uplink data sent by the terminal in a non-contention based manner.

12. The base station according to claim 11, wherein the transmitter is further configured to: when the transmission policy indicates contention-based uplink data transmission, send timing advance information to the terminal, wherein the timing advance information is used for uplink synchronization.

13. A communications system, comprising the base station according to claim 9 and a terminal, wherein the terminal comprises:
   a receiver, configured to receive a transmission policy sent from a base station, wherein the transmission policy indicates contention-based uplink data transmission or non-contention based uplink data transmission; and
   a transmitter, configured to send uplink data to the base station based on the transmission policy.

14. A terminal, comprising:
   a receiver, configured to receive a transmission policy from a base station, wherein the transmission policy indicates contention-based uplink data transmission or non-contention based uplink data transmission; and
   a transmitter, configured to send uplink data to the base station based on the transmission policy:
   wherein the transmission policy is determined based on:
   a size of to-be-sent downlink data;
   a quantity of contention-based uplink services;
   quality of service (QoS) of a downlink service; or
   a remaining resource capacity of a physical downlink control channel (PDCCH).

15. The terminal according to claim 14, wherein:
   when the transmission policy indicates non-contention based uplink data transmission, the transmitter is specifically configured to send the uplink data to the base station in a non-contention based; or
   when the transmission policy indicates contention-based uplink data transmission, the transmitter is specifically configured to send the uplink data to the base station in a contention-based manner.

16. The terminal according to claim 14, wherein:
   when the transmission policy indicates non-contention based uplink data transmission,
      the transmitter is further configured to: if the terminal determines that a preset condition for the contention-based uplink data transmission is met, send a first request to the base station, wherein the first request is used to request the contention-based uplink data transmission;
      the receiver is further configured to receive a request acknowledgment message from the base station, wherein the request acknowledgment message is used to grant the contention-based uplink data transmission; and
      the transmitter is further configured to send the uplink data to the base station in a contention-based manner; or
   when the transmission policy indicates contention-based uplink data transmission,
      the transmitter is further configured to: if the terminal determines that a preset condition for the non-contention based uplink data transmission is met, send a second request to the base station, wherein the second request is used to request the non-contention based uplink data transmission;
      the receiver is further configured to receive a grant message from the base station, wherein the grant message is used to grant the non-contention based uplink data transmission, and is used to allocate a resource; and the transmitter is further configured to send the uplink data to the base station in a non-contention based manner.

17. The terminal according to claim 16, wherein the receiver is further configured to: when the transmitter sends the uplink data to the base station in the contention-based manner, receive timing advance information from the base station, wherein the timing advance information is used for uplink synchronization.

* * * * *